United States Patent [19]
Greulich et al.

[11] Patent Number: 6,018,338
[45] Date of Patent: Jan. 25, 2000

[54] DESKTOP FORMS ORDER SYSTEM

[75] Inventors: Kenneth R. Greulich, Youngstown; Thomas M. Broad, South Wales, both of N.Y.

[73] Assignee: Moore Business Forms, Inc., Grand Island, N.Y.

[21] Appl. No.: 08/046,880

[22] Filed: Apr. 14, 1993

Related U.S. Application Data

[62] Division of application No. 07/569,128, Aug. 17, 1990, Pat. No. 5,241,464.

[51] Int. Cl.$^7$ ..................................................... G06F 15/00
[52] U.S. Cl. ................................................................ 345/333
[58] Field of Search ..................................... 395/155, 156, 395/161; 345/145, 146, 333, 334, 335, 336

[56] References Cited

U.S. PATENT DOCUMENTS

| | | | |
|---|---|---|---|
| 4,763,356 | 8/1988 | Day, Jr. et al. | 379/368 |
| 4,839,829 | 6/1989 | Freedman | 364/519 |
| 4,887,208 | 12/1989 | Schneider et al. | 364/403 |
| 4,937,439 | 6/1990 | Wanninger | 235/456 |
| 4,939,670 | 7/1990 | Freiman et al. | 364/519 |
| 4,992,940 | 2/1991 | Dworkin | 364/401 |
| 5,060,980 | 10/1991 | Johnson et al. | 283/70 |
| 5,091,868 | 2/1992 | Pickens et al. | 395/148 |
| 5,165,012 | 11/1992 | Crandall et al. | 395/100 |
| 5,255,363 | 10/1993 | Seyler | 395/164 |

FOREIGN PATENT DOCUMENTS

| | | |
|---|---|---|
| 0 338 770 | 10/1989 | European Pat. Off. . |
| 0 451 485 | 10/1991 | European Pat. Off. . |
| WO 91/07719 | 5/1991 | WIPO . |

OTHER PUBLICATIONS

Alphagraphics "Printshops of the Future"; 1988; Workbook.
Walden Graphics brochure "Phototypesetting, Desktop Publishing, or Disk to Laser Typesetting"; 1989.
Meyer, "Xerox Ventura Publisher Edition Reference Guide", copyright 1986, 1987; pp. 5–1, 5–13, 5–14, 5–100—5–103, 5–106, 5–107.
"Business Forms, Labels & Systems" magazine article, Aug., 1990.
Business Forms, Labels & Systems, vol. 29, No. 12, Jun. 20, 1991, pp. 76–77, US; "Total automation reaches the Business Forms Industry".
Business Forms & Systems, vol. 24, No. 16, Aug. 20, 1986, pp. 50, 52, U.S.; J.B. Weinzierl, "Computerizing estimaging, order, entry, inventor".
Today's Office, vol. 24, No. 1, Jun. 1989, pp. 62–63, US; B. Bradford, "Facsimile means business for Curtis 1000".

*Primary Examiner*—Phu K. Nguyen
*Attorney, Agent, or Firm*—Nixon & Vanderhye P.C.

[57] ABSTRACT

The creation and ordering of custom business forms is simplified for short-run orders, allowing the end user of the business form to design and transmit the order on a personal computer. Using appropriate design software, the business form is first designed, and then electronically transferred into a second software program which allows for the selection of a number of business form parameters, and also includes order parameters including quantity and delivery options. The business form parameters from the design software are automatically transferred to the ordering software, and any remaining parameters that must be selected are then selected in a sequence, the order quantity and delivery information is inputted, and the price is calculated, and then the custom business form and order are transmitted in machine form to a second computer remote from the first computer. At the second computer a confirmation of the order is produced, and the order is evaluated to determine where the best facility to print it is. The order is then electronically transferred to the printing location, and after printing it is shipped. The particular manner of highlighting and/or pictorially illustrating the options selectable, and a number of the particular parameters to be selected—such as the edge along which multipart forms are to be attached—are controlled for optimum utility.

16 Claims, 35 Drawing Sheets

FIG. 5B

CONTINUOUS FORM SIZE

PAGE WIDTH:
- 8 1/2
- 9 1/2
- 9 7/8
- 10 5/8
- 12 ← 57
- 13 5/8
- 14 7/8

PAGE LENGTH:
- 3 1/2
- 3 2/3
- 5 1/2
- 7
- 8 1/2 ← 57'
- 10
- 11

WIDTH INCLUDES MARGINAL PUNCH STRIP(S)
ALL CONTINUOUS FORMS HAVE LINEHOLE PUNCHES (L AND R)

HELP   OK   CANCEL

DESKTOP FO
NAME OF FO
FORM TYPE
PAPER SIZ
PAPER TYP
INK
NUMBERING
PUNCH/PE
BINDING
SHIPPING
COMMENT

INFORMATION
...TATUS
SUMMARY  0000.00
         00.00
         0000.00
EMPT
...PRICE 0000.00
         0000.00
         0000.00

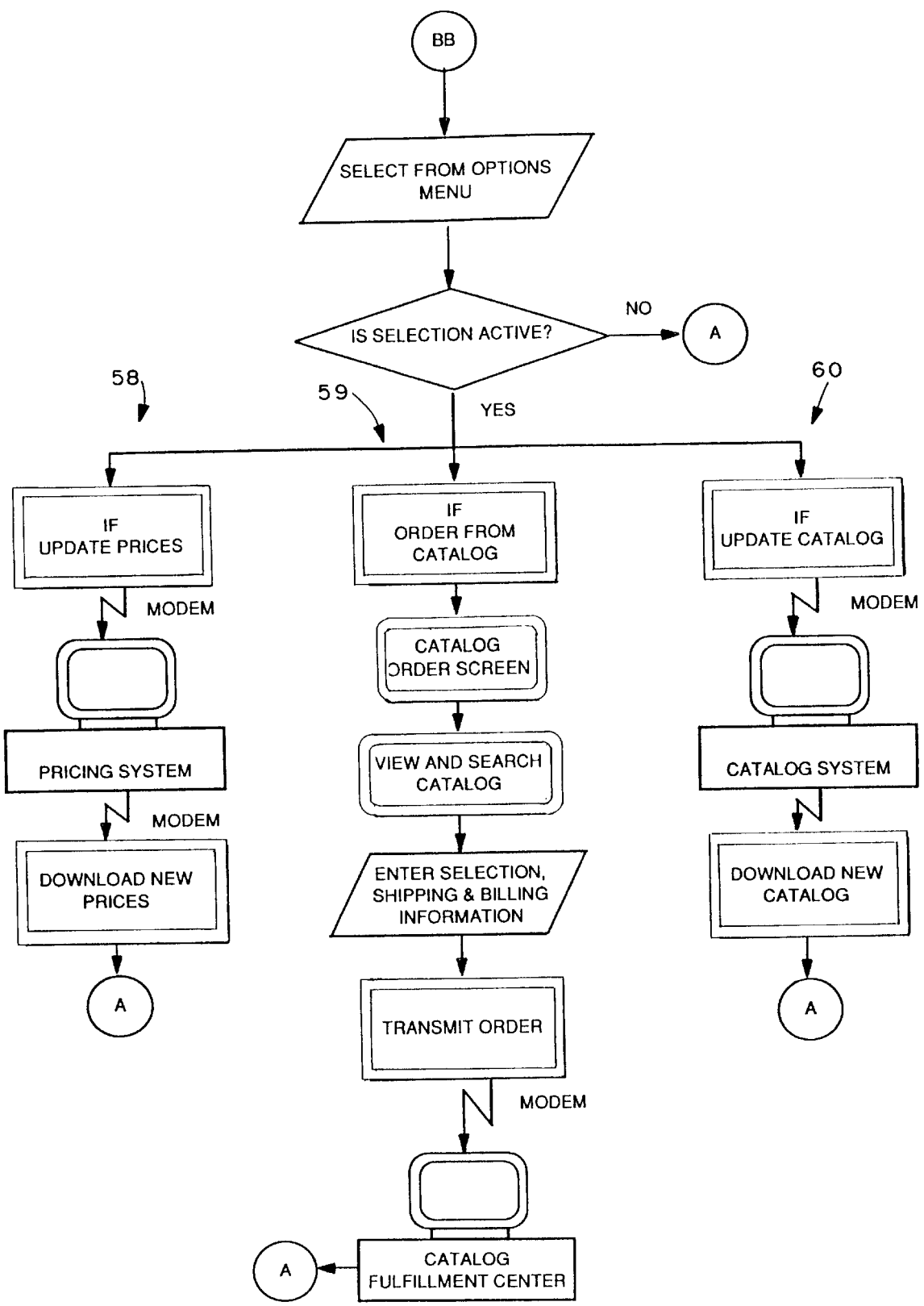

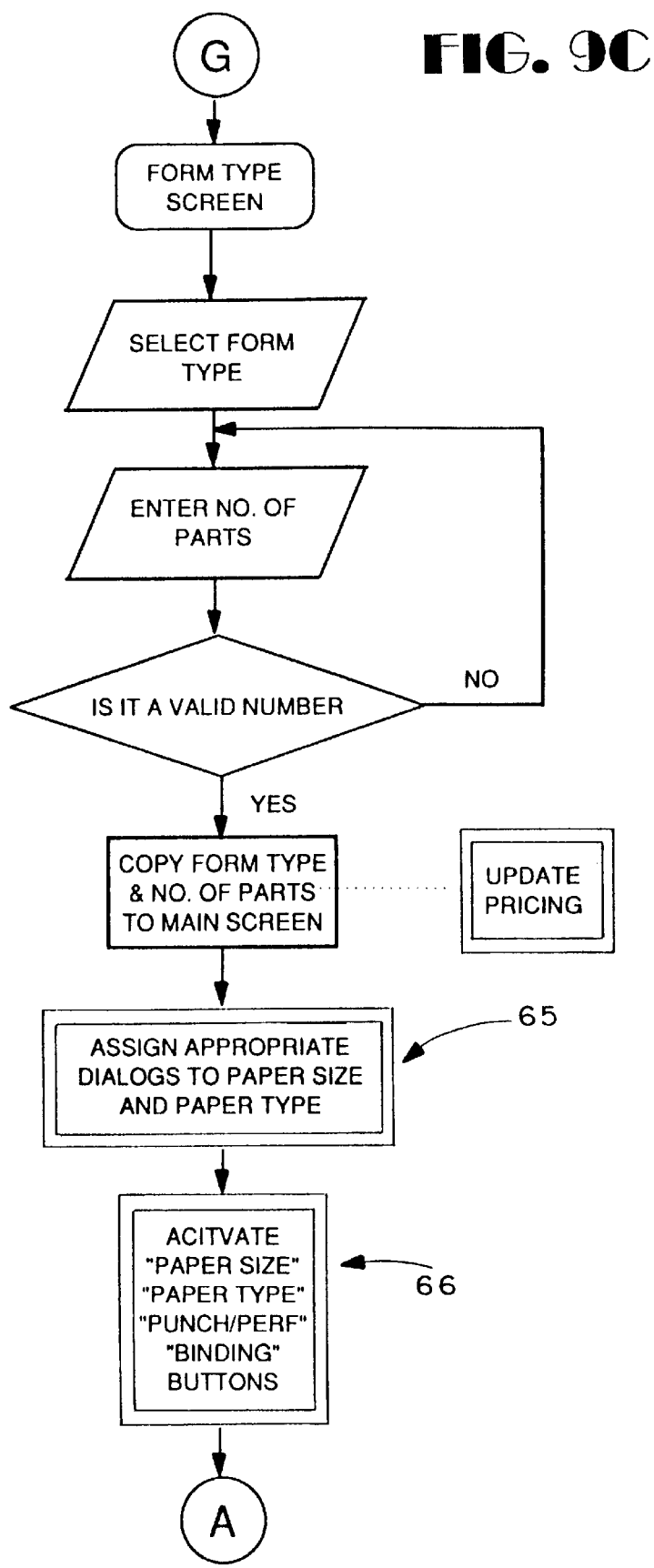

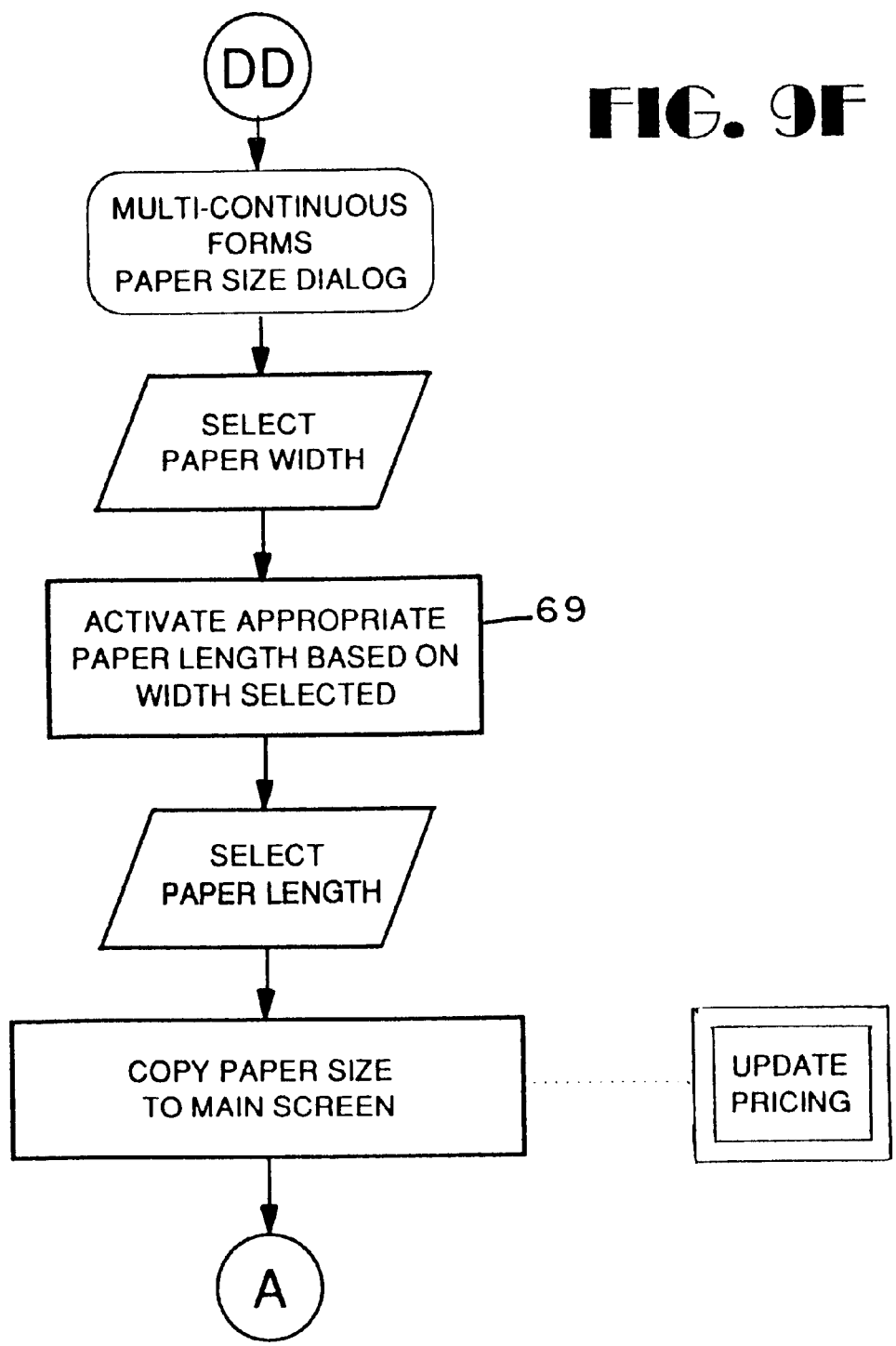

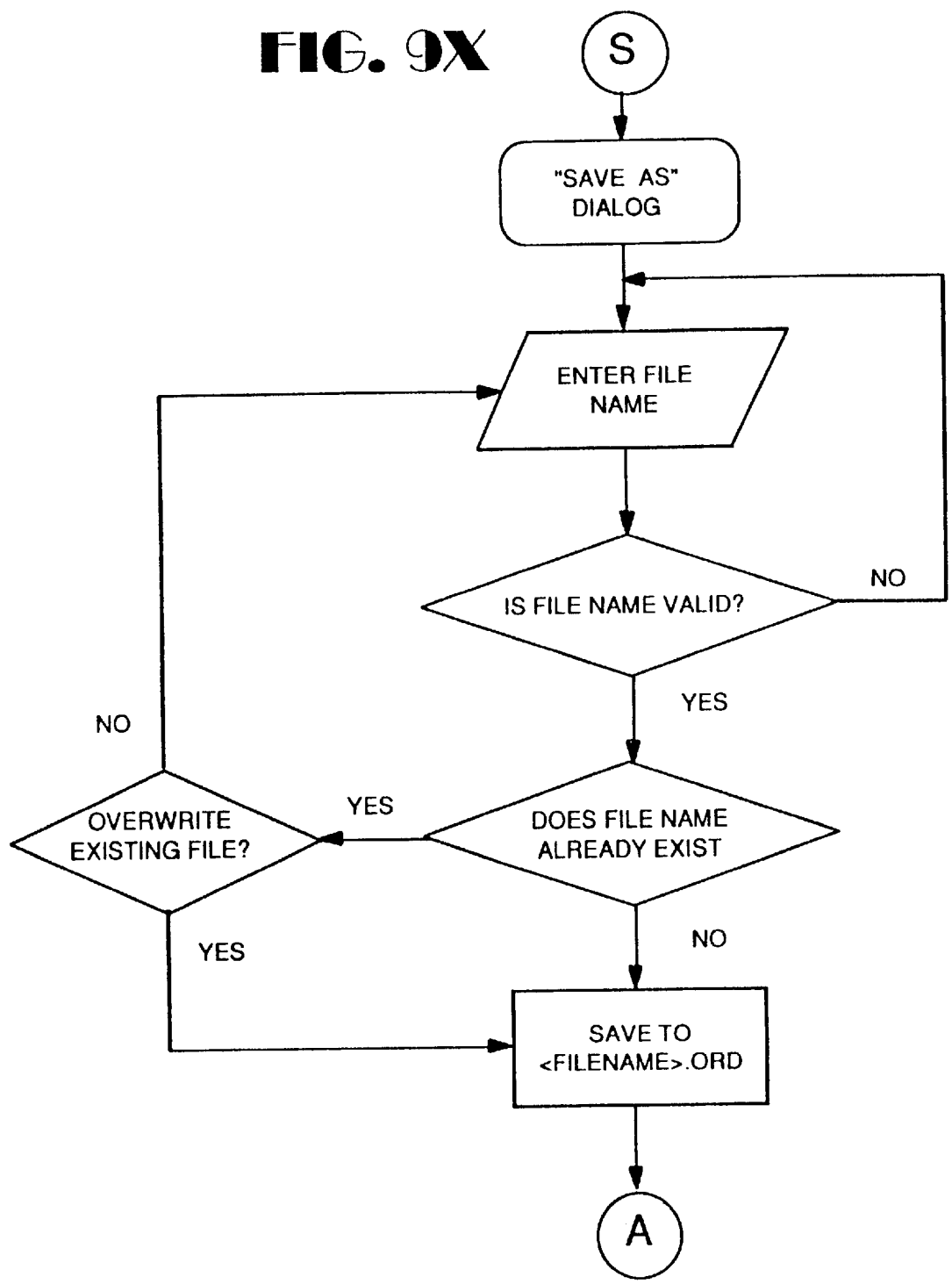

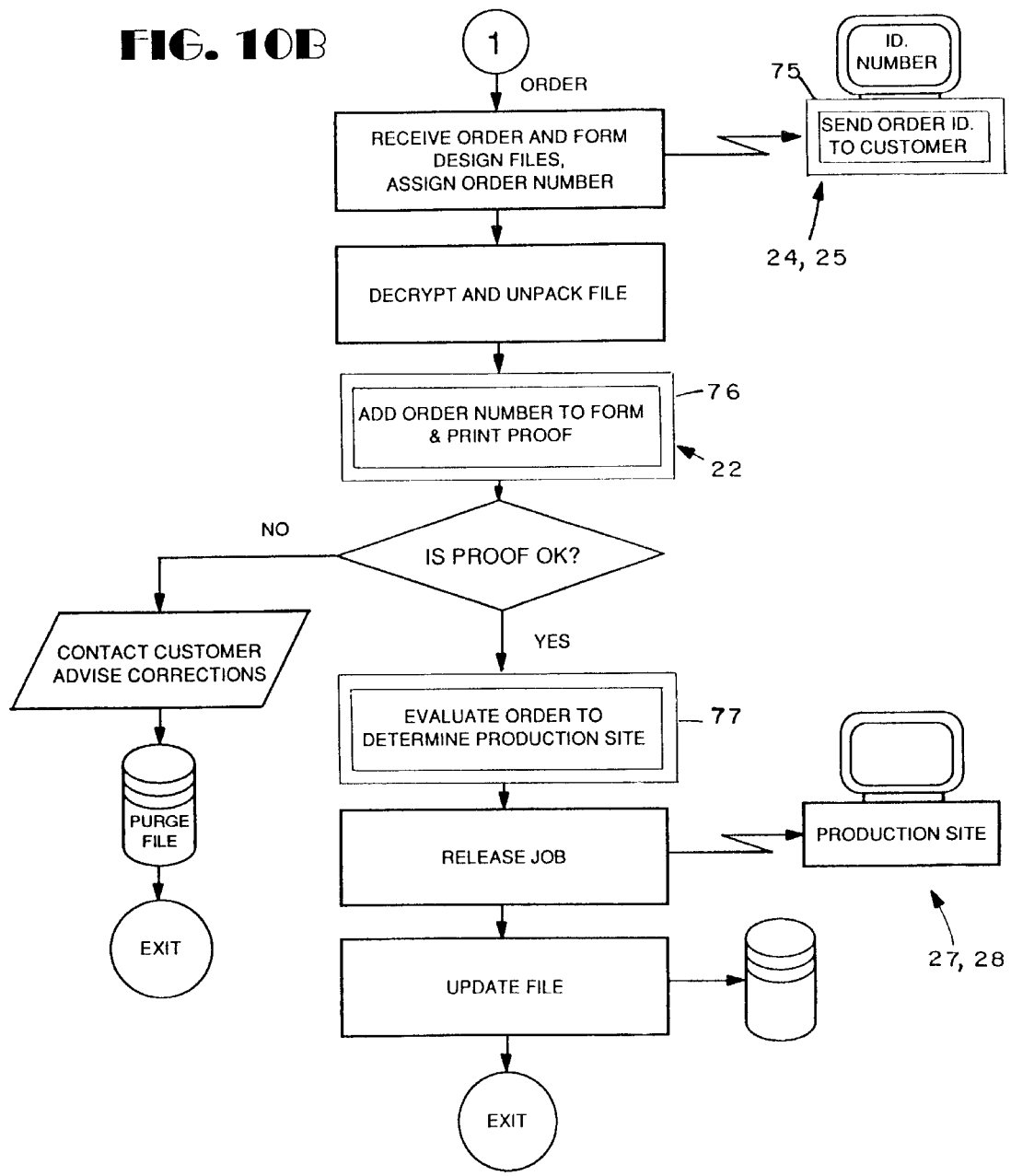

DESKTOP FORMS ORDER SYSTEM

This is a division of application Ser. No. 07/569,128, filed Aug. 17, 1990 now U.S. Pat. No. 5,241,464.

BACKGROUND AND SUMMARY OF THE INVENTION

In the sale, printing, and distribution of custom business forms, the customary practice has been for a sales representative of a large business forms manufacturer to design a form for a customer, then write up an order for the form and submit it to a plant for production. The write up of the form and the submittal of the order typically were done manually. While that procedure is extremely worthwhile for large orders of forms, especially since it involves the expertise of someone skilled in business form design, for short runs of forms, e.g. less than 5,000, there are many circumstances in which it is not cost effective to proceed in this traditional manner. Partly for that reason, a number of software packages have been developed which allow someone with a personal computer to design business forms directly on the computer. If the designer has sophisticated printing equipment, then the forms may be printed by the designer, even including multipart or continuous forms. However where the user does not have sophisticated printing equipment, the forms design alone is not useful, because the forms design must then be reduced to paper, and the paper submitted to a forms manufacturer.

Typical computer software that has been developed for the design of business forms ranges from relatively simple software—e.g. that sold under the trademark PerFORM by Delrina Technology, Inc. of Canada—to extremely sophisticated forms design packages intended to be used by forms manufacturers—such as the F3 Pro Designer™ software sold by Bloc Development Corporation of Coral Gables, Fla.

One approach that has been taken that attempts to deal with some of the problems in the prior art for short run orders is the provision of software that allows one to place an order for forms directly from a computer terminal. AlphaGraphics, Inc. of Tucson, Ariz. provides software packages that allow one to "customize" information on a very limited number of pre-existing forms by inserting one's name, address, and logo on the forms. This "customizing" information is then transmitted via disk or electronically to AlphaGraphics, along with an order also placed by computer, for printing of the forms. While this can simplify the procedure for obtaining short runs of business forms, because of the very limited number of standard forms available, it is not truly for the production of custom forms, rather merely just for the provision of customizing information on pre-existing standard forms.

According to the present invention, it is possible to create truly custom business forms having a wide variety of parameters, designs, verbiage, and the like, at a customer's personal computer. The customer can then place an order for that custom form directly from his/her personal computer, and transmit the custom form—as well as order information—electronically (or by disk) to an order receiving location. At the order receiving location, an order verification is printed, credit is verified or payment made by credit card or the like is transferred, and a determination is made about the best location to print the form based upon where the form is to be delivered, form parameters, and the like. The form and order information are then transmitted electronically to a manufacturing location at which the form is printed and shipped. In this way, the total functions of forms design, ordering, and printing can be simplified.

A number of advantages associated with the invention are: the ability to allow the customer to lay out its own forms on personal computers; eliminates or reduces labor intensive portions of business form order preparation, such as design and composition; manages and automates the entire order entry process; decreases the time required to produce and deliver short run orders of business forms; and reduces the manufacturer's overhead costs in producing short run orders.

In order to maximize the utility and "user friendliness" of the system according to the invention, it is highly desirable to provide various graphic features and computer screen formats. Significant features are: the highlighting of only those functions that need be utilized on a particular screen, and/or highlighting only the available options from all of the options that are displayed; overlaying one screen on top of another so that significant portions of the underlying screen are available for viewing at the same time further options are being selected; and/or actually illustrating an object (business form) to be produced in pictorial manner so as to allow the user to readily visualize how the final form construction will appear, which can be particularly significant for multipart forms that are connected together along one edge.

According to one aspect of the present invention, a system for the production to order of custom business forms is provided. Each custom business form has a plurality of parameters that must be determined, and the inputting of order information is also necessitated. The system comprises: A first computing means for storing and manipulating data, at a first location. A second computing means for storing and manipulating data, at a second location, remote from the first location, and including a monitor. First control means for controlling the second computing means to custom design a plurality of first parameters of a business form, to produce a custom business form in machine format. Second control means for controlling the second computing means and storing price information, the second control means for displaying order parameters, including quantity and delivery options, for selection by an operator, and a second plurality of business form parameters. The second control means also automatically determines the first plurality of business form parameters from the custom business form in machine format and matches them with the second plurality of business form parameters so that all business form parameters from the first control means are entered in the second control means. Operator interface means for the second computing means for allowing operator selection of order parameters and entry of any of the second plurality of business form parameters not automatically determined from the custom business form in machine format. The second control means further includes means for controlling the second computing means to calculate prices once sufficient order and business form parameter data has been inputted, and, to provide a completed order in machine format. And, first communication means for transmitting the custom business form in machine format, and the completed order in machine format, from the second computing means to the first computing means. The second control means also preferably further comprises means for distinctively displaying which of the second plurality of business form parameters has not been automatically determined from the custom business form, and requiring operator selection through the operator interface means of the distinctively displayed ones of the second plurality of business form parameters before the order can be completed or transmitted by the first communication means.

The second plurality of parameters comprises a form type parameter which includes single sheet and multisheet edge connected set options. The form type parameter for the multisheet edge connected set option includes the further parameter of which edge the sheets of the set are to be connected at, and the second control means further comprises means for illustrating possible edges for connection dependent upon associated other parameters selected, and a pictorial simulation of the form configuration with the edge connection options highlighted, on the second computing means monitor. The second plurality of parameters typically include business form size, number of parts, color of ink, numbering options, and form type, the form type including continuous forms and multipart forms with the parts attached along an edge.

The second control means also preferably comprises means displaying a first plurality of options for selection once one of the second parameters is activated, and means for—after selection of one of the first plurality of options—displaying a second plurality of options for selection, and highlighting only those of the second plurality of options that are available for selection given the first plurality of options selected. This may be continued for other sets of options.

According to another aspect of the present invention, there is provided a computer selection and display means. This computer selection and display means comprises: A computer having a monitor; and, means for controlling the computer and monitor: to provide a plurality of a first set of selectable options on the monitor; and to provide a graphic display of second and third sets of selectable options overlying, but not completely obscuring, the first set of options. The means for controlling the computer and monitor preferably further comprises means for providing a fourth set of selectable options graphically displayed with the second and third sets of options, and highlighting only selected ones of the fourth sets of options depending upon the selection of the second and third sets of options; and means responsive to a preliminary selection of the fourth set of options for pictorially illustrating a simulation of an object to be created by control of the computer, so that an operator may more easily visualize the object to be created. As earlier described, this computer selection and display means is preferably utilized for the creation of a business form, with the first set of options comprising a business form type option including multipart forms, and a form size option, and the second and third sets of options for the form size option—once a multipart form has been selected by the form type option—comprising predetermined length and corresponding width options and either portrait or landscape orientation options, with a fourth set of options comprising top, bottom, right or left edge attachment locations. A rectangular business form is then pictorially illustrated with a highlighted edge, the highlighted edge corresponding to the fourth set of options preliminarily selected.

It is the primary object of the present invention to provide for the simplified and effective design, ordering, and production of short run orders of business forms, utilizing user friendly displays. This and other objects of the invention will become clear from an inspection of the detailed description of the. invention, and from the appended claims.

BRIEF DESCRIPTION OF THE DRAWINGS

FIGS. 6 through 8 are flow sheets of other significant control procedures related to the basic control flow sheet of FIG. 2;

FIGS. 9u–9aa are flow sheets illustrating sub-control procedures based upon the flow sheet of FIG. 6;

FIGS. 9ab–9af are flow sheets illustrating sub-control procedures related to the flow sheet of FIG. 7;

FIGS. 10a and 10b are flow sheets illustrating order receiving control procedures at the order receiving computer.

DETAILED DESCRIPTION OF THE DRAWINGS

Figure 1:
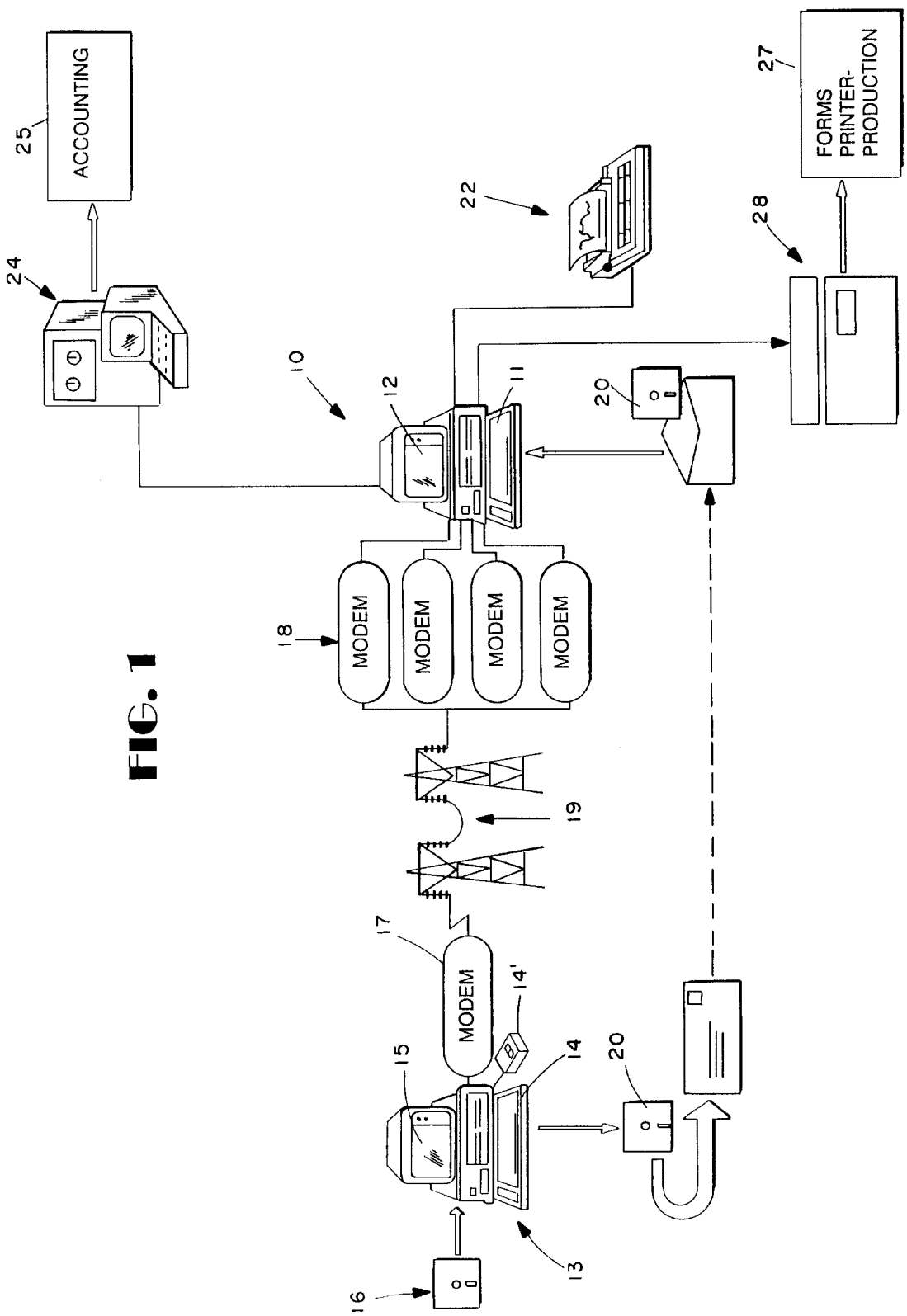
FIG. 1 is a schematic of exemplary hardware which may be utilized as part of the system according to the present invention.

FIG. 1 schematically illustrates exemplary hardware that is utilizable in the system according to the present invention. The hardware includes a first computing means, such as the personal computer 10, which preferably includes a keyboard 11 and/or other operator interface means (e.g. a mouse) and a monitor 12, at a first location, in this case the first location being an order reception facility of a business forms manufacturer. The first computing means 10 preferably comprises a personal computer for storing and manipulating data. A second computing means 13, having a keyboard 14 and/or other operator interface means such as mouse 14', and a monitor 15 is provided at a second location remote from the first location. The second location typically is a customer's office. A first control means—typically comprising pre-recorded computer programs on a disk 16 or the like—controls the second computer 13 for custom design of a plurality of first parameters of a business form, to produce a custom business form in machine format. The number and type of the first plurality of parameters depends upon the sophistication of the software comprising the first control means. For example if the software is a relatively simply forms design program, such as sold commercially under the trademark PerFORM, the details of the form and its basic size are provided among the first plurality of parameters, however more sophisticated parameters such as multipart or continuous form types, are not. If a sophisticated forms package—such as the F3 Pro Designer package—is utilized, then virtually all of the form parameters can be determined among the first plurality.

The system according to the invention also comprises a second control means for controlling the second computing means 13 and storing price information. The second control means controls the monitor 15 to display order parameters, including quantity and delivery options, for selection by an operator, and a second plurality of business form parameters. The second plurality of business form parameters may be co-extensive with the first plurality where the first control means is a sophisticated software package, but typically the second plurality of business form parameters are more extensive than the first. While a first and second control means are discussed, it should be understood that typically the forms design and order software would be integrated on a common disk 16, for ready interaction.

The first and second control means on disk 16 ultimately control the personal computer 13, utilizing the monitor 15 and operator interface 14, to produce a custom business form in machine format, and order information relating to that business form, including quantity and shipping information. In this regard it is noted that "custom business form" means a form having a wide variety of verbiage, graphical representations, positioning of component parts, and the like determined by the designer, not merely address and logo information. First communication means are provided for transmitting the custom business form in machine format, and the completed order in machine format, from the second computer 13 to the first computer 10. Such communication means preferably takes the form of the modems 17, 18 (carried over public telephone lines 19), but alternatively the machine format of the custom form and order may be captured on a disk 20 and mailed to the order receiving facility at which the first computer 10 is located.

The first computer 10 preferably is connected via modems 18, etc., to the first computer 13 for another purpose. It is highly desirable that up-dated price information be transmitted from the first computer 10 to the second computer 13. This may be done periodically as long as the second computer 13 is in a position to receive the up-dated pricing information (e.g. when it requests it), or it may be done at the time of a transaction, the up-dated price information being transmitted by the first computer 10 before it allows the second computer 13 to transmit order and custom business form information.

At the order receiving facility at which the computer 10 is located, the orders are received in electronic form by the computer 10, and are logged, with the order information desirably retained for possible future reorders. The order format will typically be in ASCII format, and a proof may be printed out on a proof printer 22 for review and editing. The form data may be in native file format or in PostScript output.

The first computer 10 could communicate through conventional order tracking equipment 24 with an accounting facility or computer 25. This would provide for a credit verification, application of charges from a credit card, and the production of an order confirmation which would be sent to the customer, either by mail or via computer (to the second computer 13).

The first computer 10 also communicates with a forms printing or production facility 27. Typically, the custom form would be transmitted in PostScript format for ready use by an imaging system or the like, such as the Linotronic imaging system 28. Alignment marks for perforations and punches will be contained in the data file transmitted from the computer 10, but cut marks for plate trimming will be added. In some circumstances it may be necessary to step-and-repeat a form image, and add gap marks. The computer 10 and/or order tracking system 24 will determine which of a plurality of available production facilities 27 would be best suited for producing the particular custom form, depending upon scheduling, geographical location, and capabilities of the facilities 27, particularly with respect to the shipping location for the forms. Ultimately the forms will be printed at a forms production facility 27 and shipped to whatever location the customer specified, whether at the same location as the second computer 13 or some other branch office of the customer.

Figure 2:
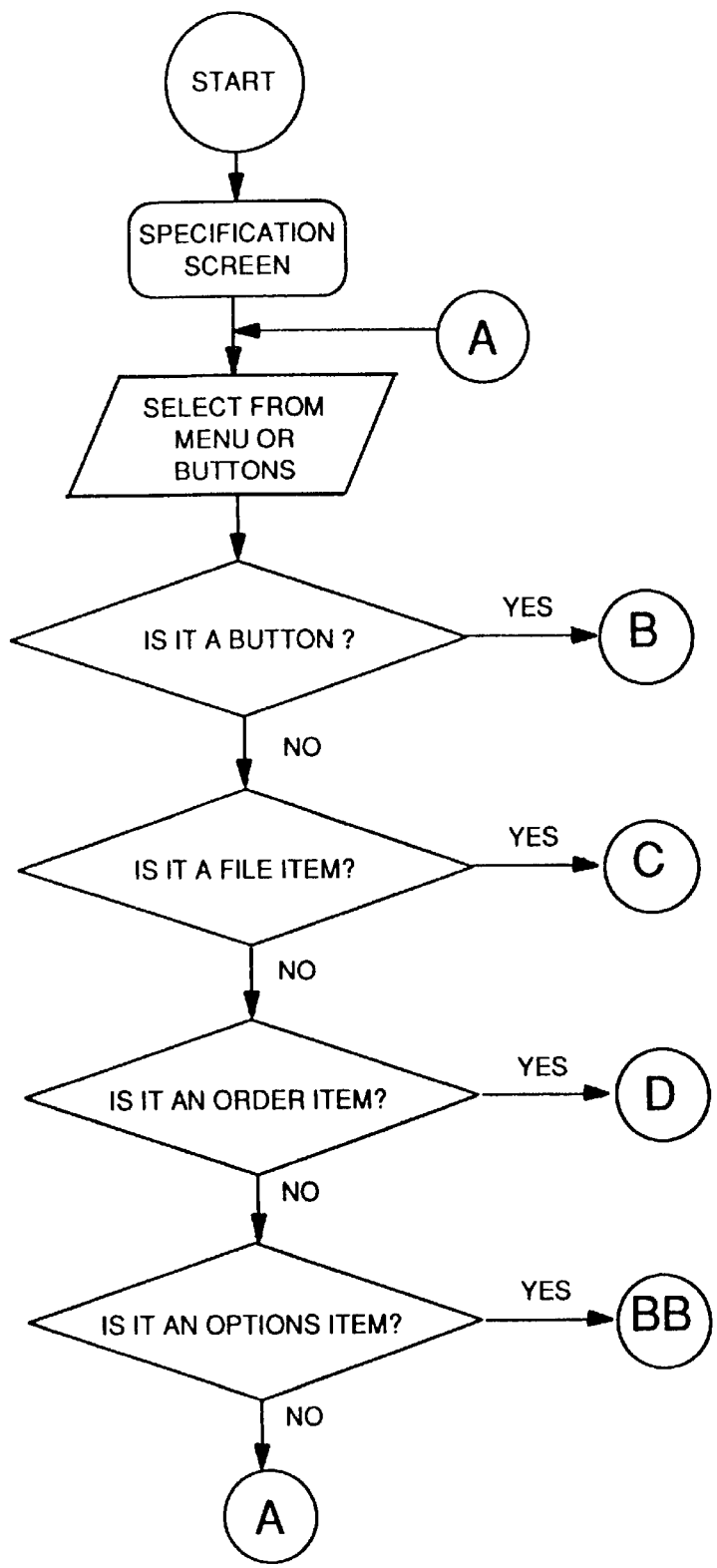
FIG. 2 is a flow sheet illustrating the major control options for the control procedures of the second control means of the apparatus of FIG. 1.
Figure 3:
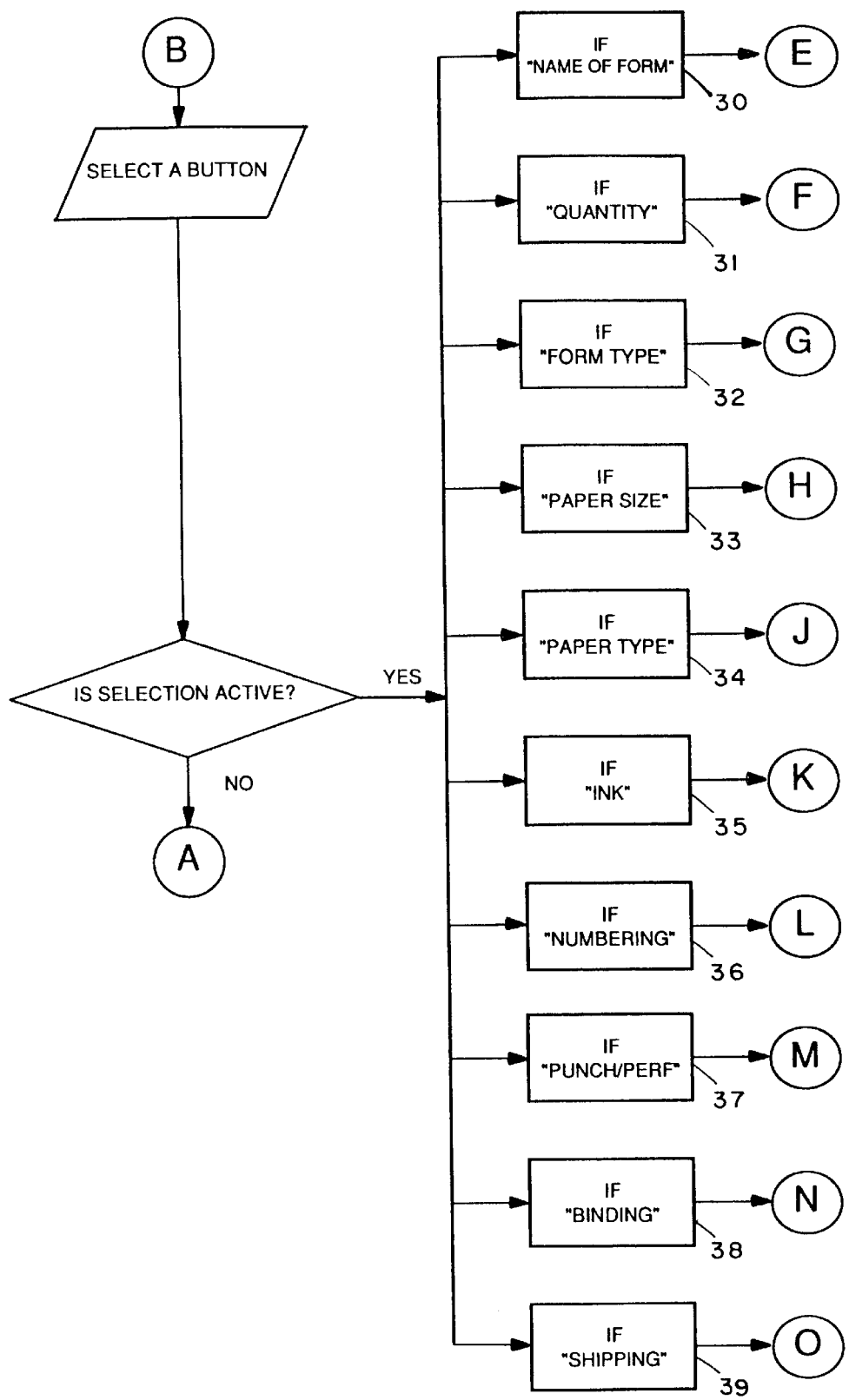
FIG. 3 is a flow sheet for the first option of the procedure of FIG. 2.

FIG. 2 illustrates the basic flow chart for the major control procedures for the second control means (the first control means being commercially available, e.g. as from Delrina Technology, Inc.). Where a button—typically activated by using a mouse—is to be selected, then the control procedures set forth in FIG. 3 is initiated. According to the present invention it is desirable that all of the options set forth in FIG. 3 be available. The option 30 is merely to allow capture of the custom form that has already been designed in the forms software (a first control means) to be captured into the order program (second control means). The quantity information 31 must at all times be inputted into the order program. The second plurality of parameters—those provided in the order software (second control means)—preferably include form type 32, paper size 33, paper type 34, ink 35, numbering 36, punching or perfing 37, and binding 38. Shipping information—39—must be provided as one of the ordering elements, like the quantity 31.

Figure 4:
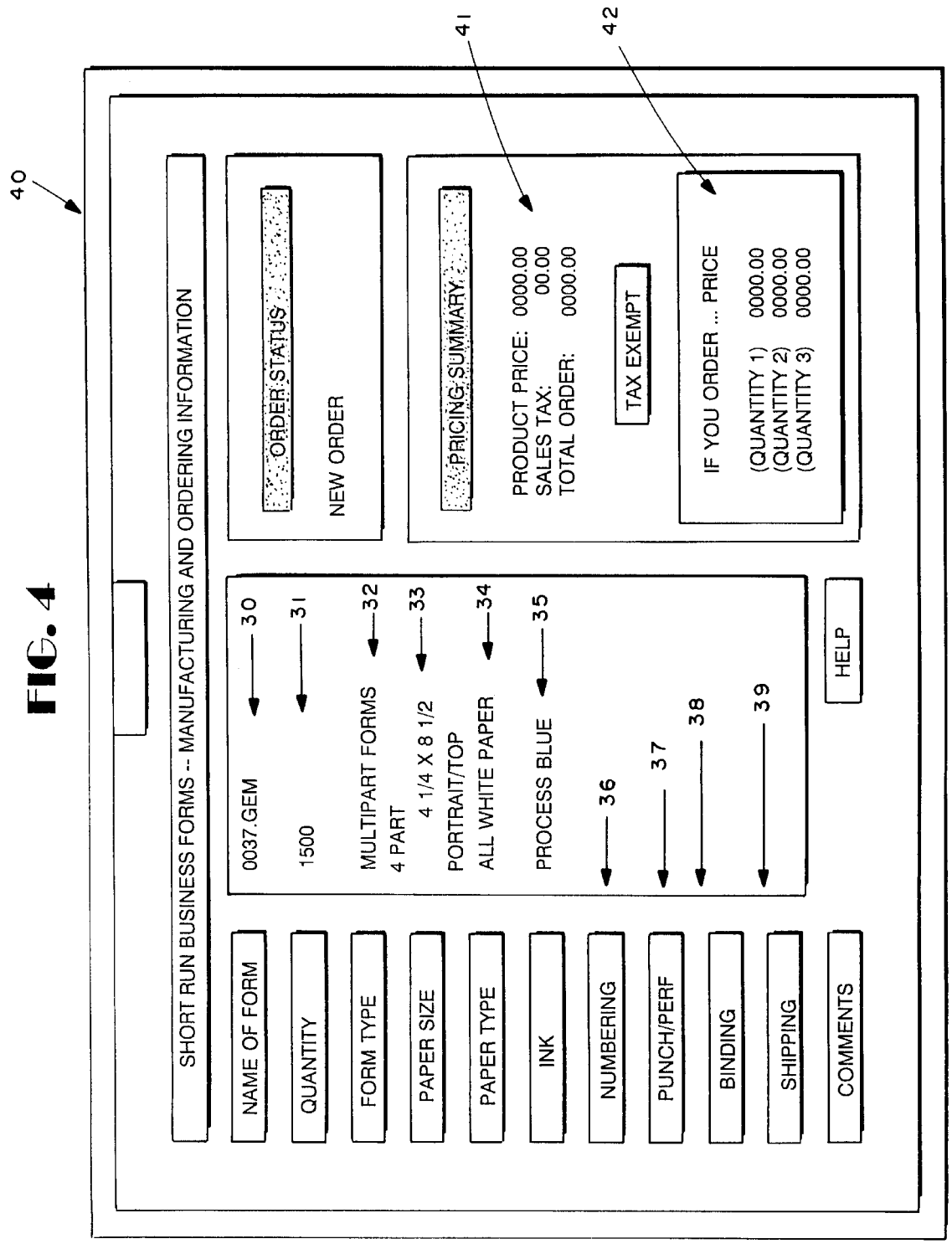
FIG. 4 is an illustration of a computer monitor with the general options illustrated in FIG. 3 displayed, as well as other order information.

FIG. 4 shows a typical screen 40 which successfully implements the flow chart of FIG. 3 in a user friendly manner. The operator keys in the name of the form at 30. The form name will have been determined in the business form design software (first control means), and by entry of the form name after it is keyed in at 30, the custom form which has been designed in the forms design package is captured. Automatically any of the parameters 32 through 38 which were previously determined in the forms design package (the first plurality of parameters) will be inputted in the order software (second control means). For the example illustrated in FIG. 4, if after entry of the form name 30 and the quantity 31 the display illustrated in FIG. 4 came up, that would mean that form type (multipart—four part—forms), paper size (4¼×8½ inches in the portrait configuration, the parts held together at the top edge), the paper type (all white paper), and the ink color (process blue) would have been determined in the first control means—the form design software. Any numbering, punching or perfing, or binding to be done would then be selected among the parameters 36 through 38. In order to make the system as user friendly as possible, if the parameters 32 through 35 have already been automatically entered, the indicia on the left hand side of the screen 40 associated therewith will be highlighted in some manner, such as a more vibrant color, a darker tone, a black border around the indicia, etc., while the indicia associated with the parameters yet to be considered—parameters 36 through 38—will be in regular format.

Before or after the desired parameters 32 through 38 have been selected, the quantity 31 and shipping instructions (typically an address and a type of shipping—either overnight or regular) will be entered, and the second computing means automatically calculates the price, sales tax, and the amount of the total order, as indicated at 41 in FIG. 4. In order to provide the customer with information that can assist him/her in optimizing the order, a display 42 is also preferably provided showing the different prices that exist if different quantities are ordered. For example if there are three different standard quantities that can be ordered (e.g. quantity one 1,000 forms, quantity two 1,500 forms, quantity three 3,000 forms), the price for the particular custom form designed for each of those quantities will be displayed in the box 42 so that the quantity information at 31 can be changed by the customer before the order is transmitted to the first computer 10.

Note that indicia indicating each of the second business form parameters, and order parameters, are provided on the left side of the screen in FIG. 4 in rectangular boxes. The boxes may be highlighted to indicate which parameters are yet to be determined.

Figure 5A:
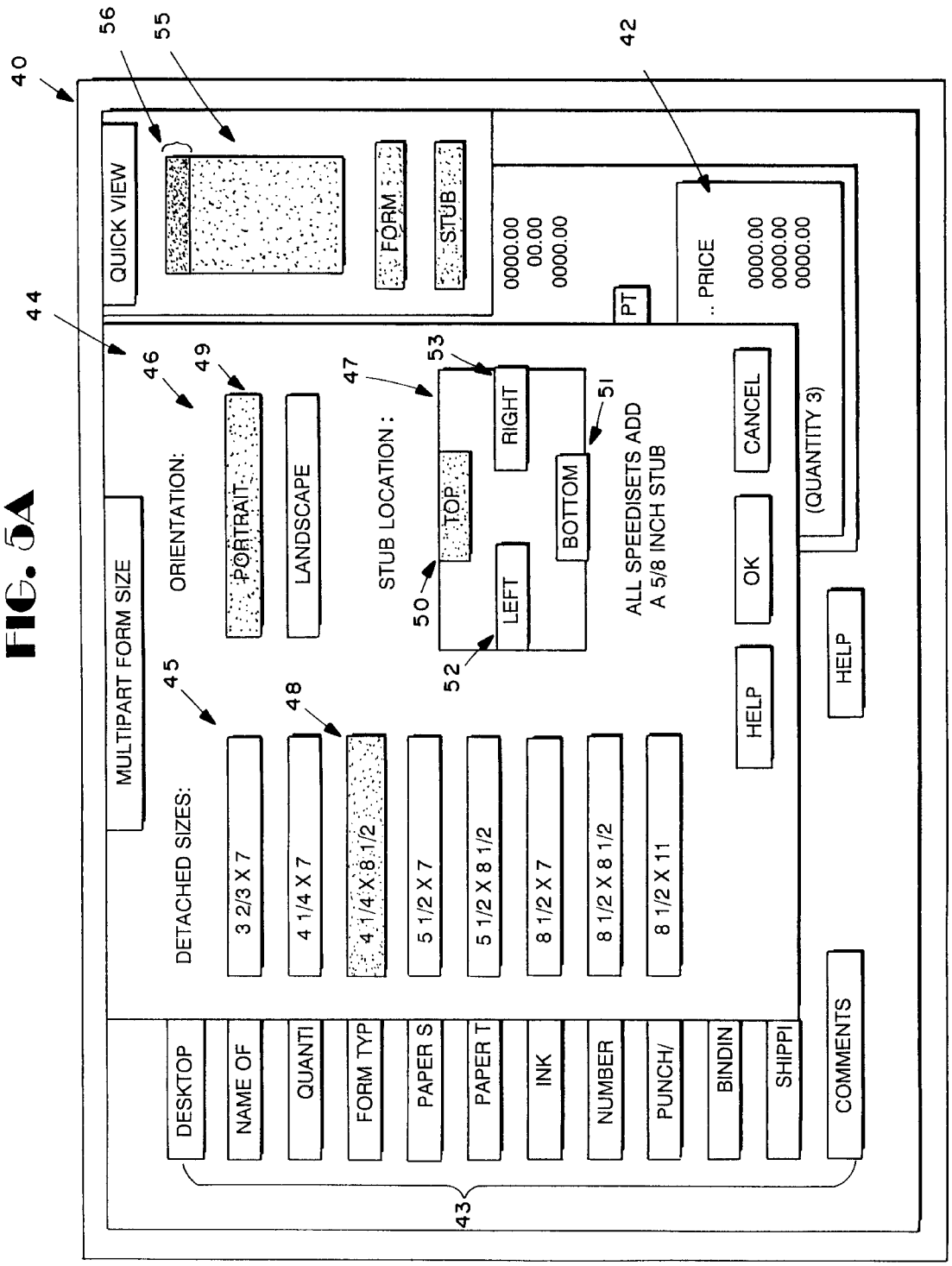
FIGS. 5A and B are each a view like that of FIG. 4 only showing a subset of options, and in the case of FIG. 5A a pictorial representative of a business form to be produced, displayed over the screen of FIG. 4.

FIGS. 5A and 5B illustrate another aspect according to the present invention which makes the system according to the invention very user friendly, while allowing the selection of numerous options. With respect to FIG. 5A, assuming that the form type procedure 32 has been selected so that the custom form to be produced is a multipart form (the "form type" function would typically allow selection of single sheets, checks, multipart forms, continuous forms, and among multipart forms either two, three, or four part forms), when the paper size 33 function is initiated, a graphic display 44 is provided on the screen 40 overlying, but not completely obscuring, the first set of options 43 on the screen 40. As clearly seen in FIG. 5A, while the graphic display 44 is itself readily readable, the user is still able to see the basic selectable options 43.

On the graphic display 44 are a second set of options 45, a third set of options 46, and a fourth set of options 47. The second set of options 45 provide for various lengths and widths of forms, the display 44 coming on the screen 40 when the function 33 is selected. The third set of options 46 is the orientation of the rectangular form determined by the sizes 45. The orientation can either be portrait (long edge vertical) or landscape (long edge horizontal). The options 45, 46 are selected by moving a mouse arrow (or cursoring) to the desired option and then indicating preliminary selection (e.g. as by pressing a mouse button, or a key on a keyboard 14). For example for the particular display illustrated in FIG. 5A, the size 4¼ inches×8½ inches—48—is highlighted, while the orientation "portrait"—49— is highlighted. Once the selections of the options 45, 46 have been made, then the fourth set of parameters 47—the stub location—are partially predetermined. For example, as illustrated for the display in FIG. 5A, with a size of 4¼×8½ inches and an orientation of portrait, the only stub locations that are practical are the top and bottom, illustrated by reference numerals 50, 51. This is indicated on the display of FIG. 5 since the indicia for the options 50, 51 are bold, while the indicia for the left and right options 52, 53 are discrete (light) rather than bold. Thus the customer knows that he has only two of the normal four options of the fourth options 47 available, and will select the appropriate one.

As a further very desirable feature according to the invention, in order to allow the operator to visualize the form that will be produced when the options indicated in bold in FIG. 5 (48, 49, 50) are selected, a pictorial illustration 55 is provided of the business form to be produced. Note that the top of the pictorial illustration is bold—as indicated at 56—in accordance with the "top" selection at 50 of the fourth options 47. If the operator cursors to the "bottom" selection 51 instead, then the bold part 56 will move to the bottom of the pictorial illustration 55. While this feature is described with respect to the connection of multipart forms along a particular edge, it is to be understood that this feature can also be utilized for other form functions, such as perforations, etc.

FIG. 5B illustrates another exemplary screen which uses an overlay feature. In this case, the "Form Type" selection made was "Continuous". The screen that has been overlaid on screen 40 after the "Paper Size" button is activated—as seen in FIG. 5B—requires selection of paper width first. Once a paper width 57 has been elected—in this case "12 inches", that selection is highlighted, and then the only possible length options 57' given that width selection—in this case 7, 8½, and 10 inches—are highlighted over) by making a bolder border, by color, or by general intensity. The operator then selects from among those options 57' e.g. by using the mouse arrow illustrated, and enters that choice. [Note that the features illustrated in FIG. 5B are schematically described in FIG. 9f.]

Figure 6:
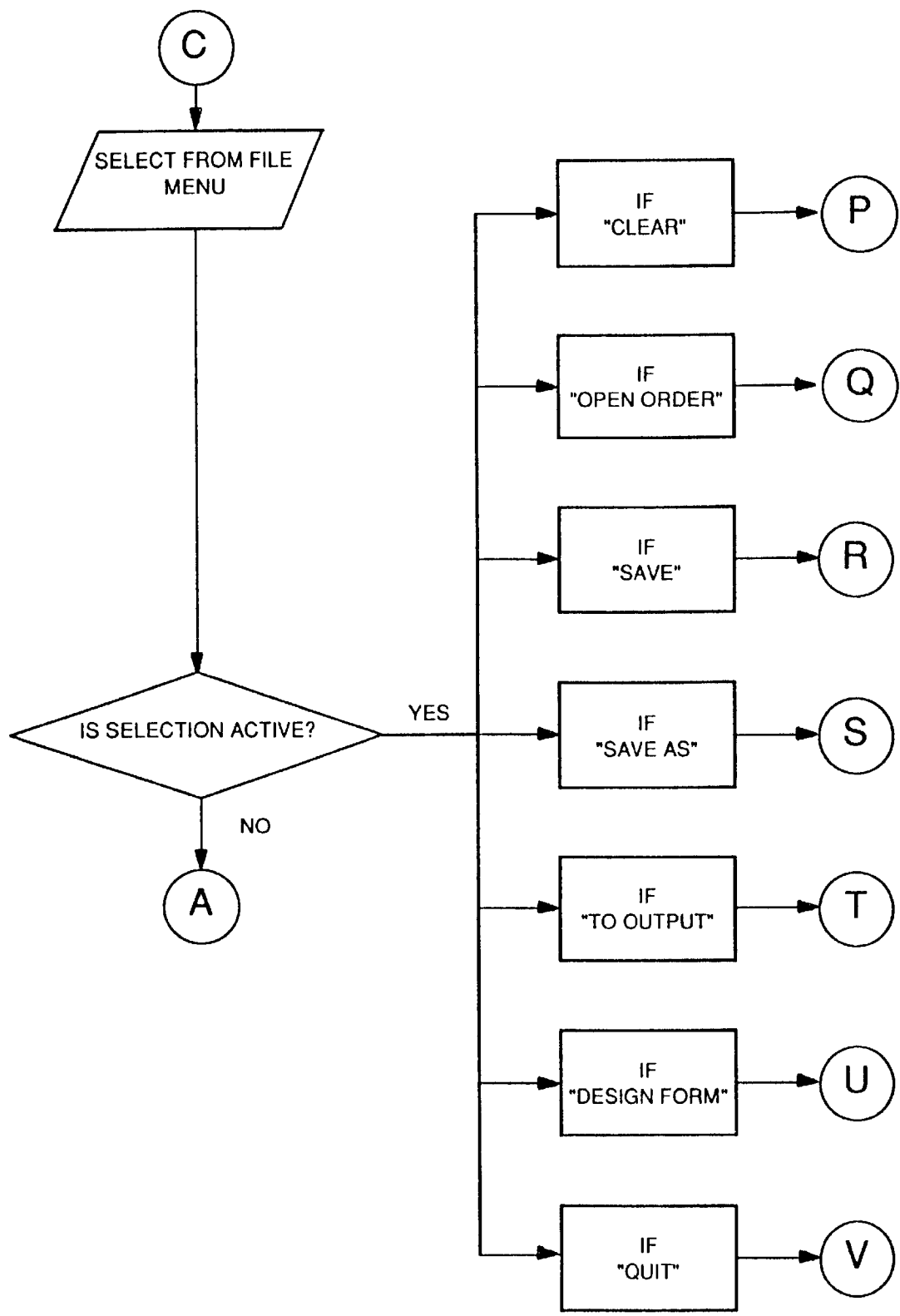
Figure 7:
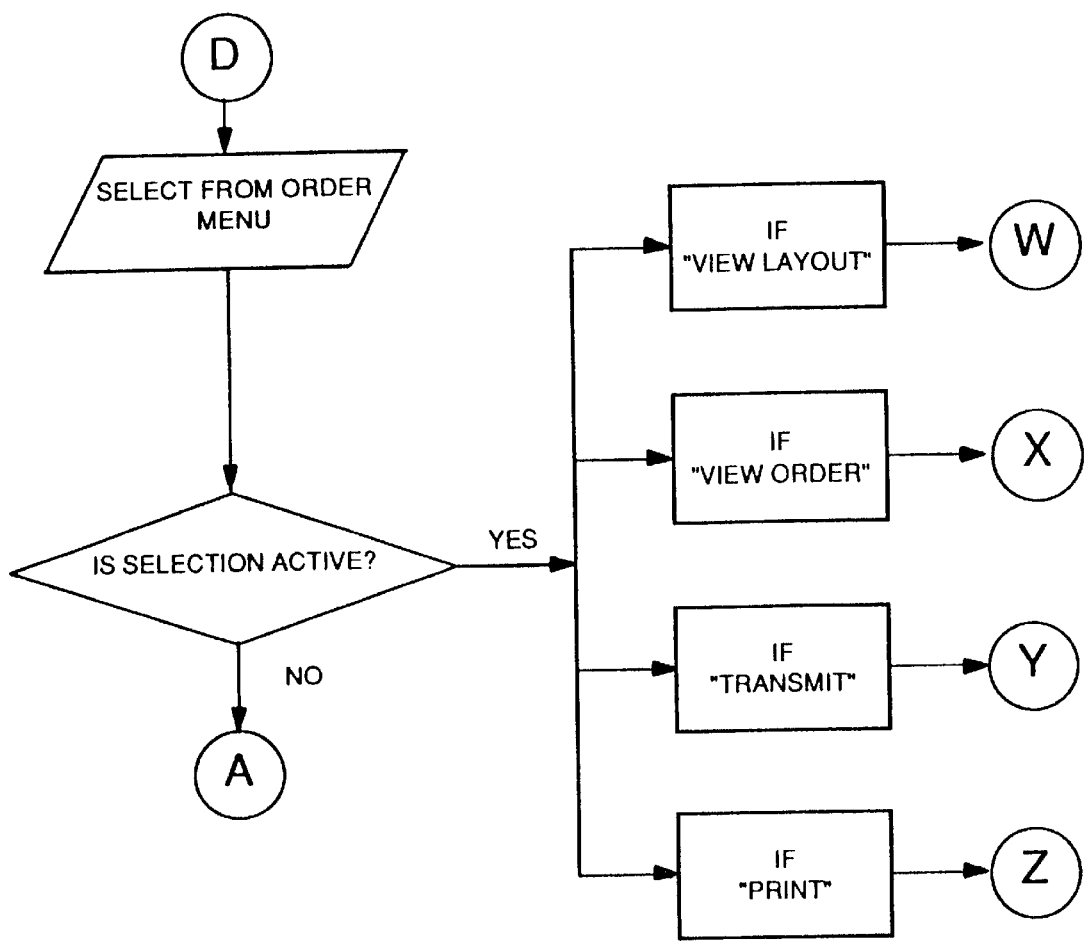

FIGS. 6 and 7 illustrate self-explanatory procedures that will be followed if the items C or D in FIG. 2 are pursued. FIG. 8 illustrates the last option (from top to bottom) in the major procedures flow chart of FIG. 2. In the particular procedure of FIG. 8, one can specifically request and receive the up-dated pricing information, as indicated by the column 58. As still further options, however, one can order from a catalog that is already loaded on the second computer 13, as indicated by the middle column options 59, or one can load up-dated information about the catalog (e.g. office product items and standard business forms in the catalog that have been added or discontinued, new prices, etc.) by the selection of the options illustrated in column 60.

Figure 9A:
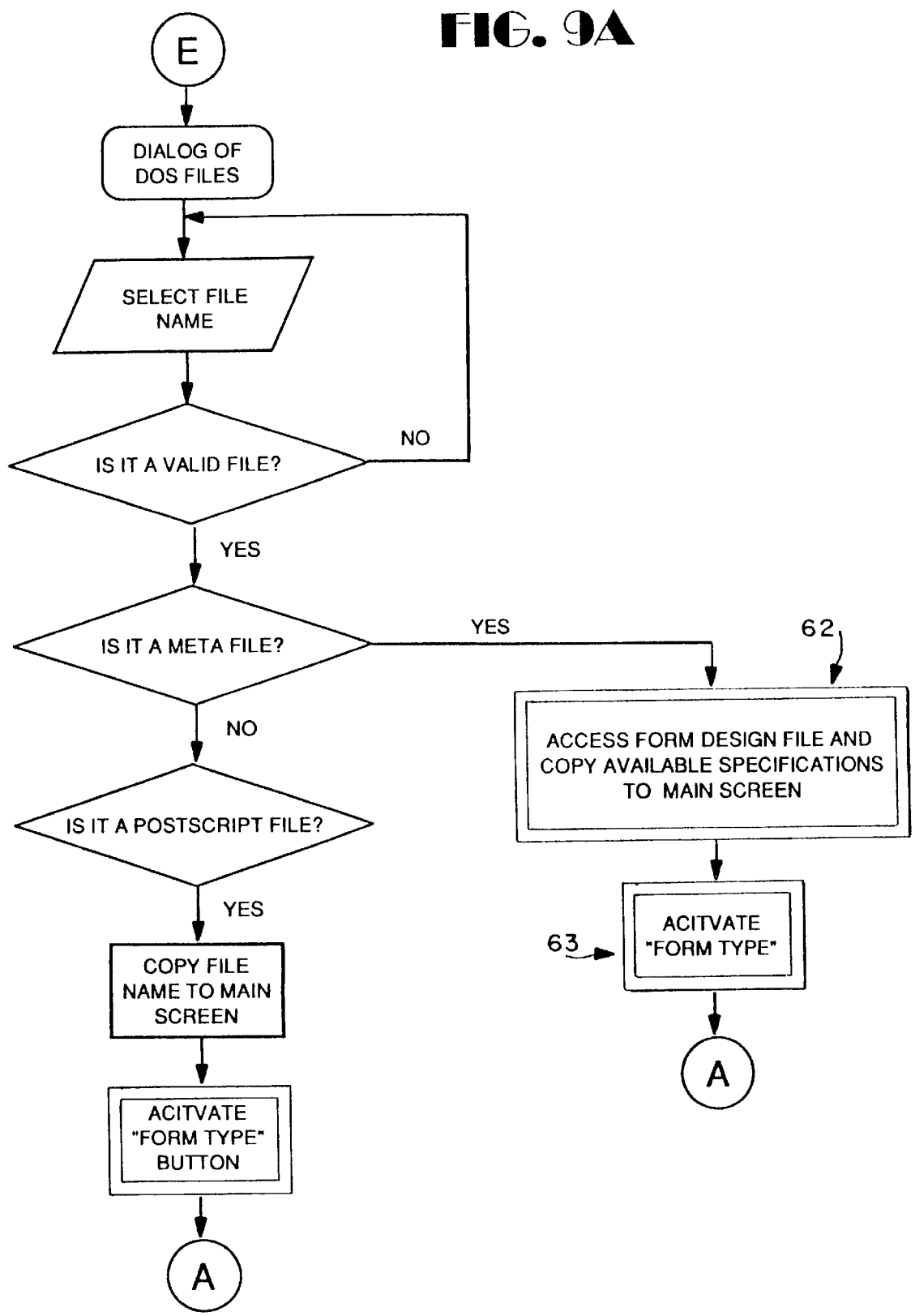
FIGS. 9a through 9t are flow sheets illustrating sub-control procedures for the flow sheet of FIG. 3.

The flow charts of FIGS. 9a–9af are basically self-explanatory. However specific features or terminology that is not entirely readily understandable will be specifically described.

Wherever it is used, the word "dialog" describes a communication function, that is that the operator and the computer communicate with each other. This is opposed to an information box, which tells one what information is available, or gives options.

For the particular flow chart of FIG. 9a, which relates back to the "name of form" function 30 of FIGS. 3 through 5, note procedure 62 which illustrates a novel feature of the invention whereby the design parameters (the first plurality of parameters) from the custom form in the form design software (e.g. PerFORM) are captured. The first of the second parameters which must be selected—since it controls most of the other parameters—is the "form type" (e.g. continuous, single sheet, multipart, check, etc.), as illustrated at 63.

Figure 9B:
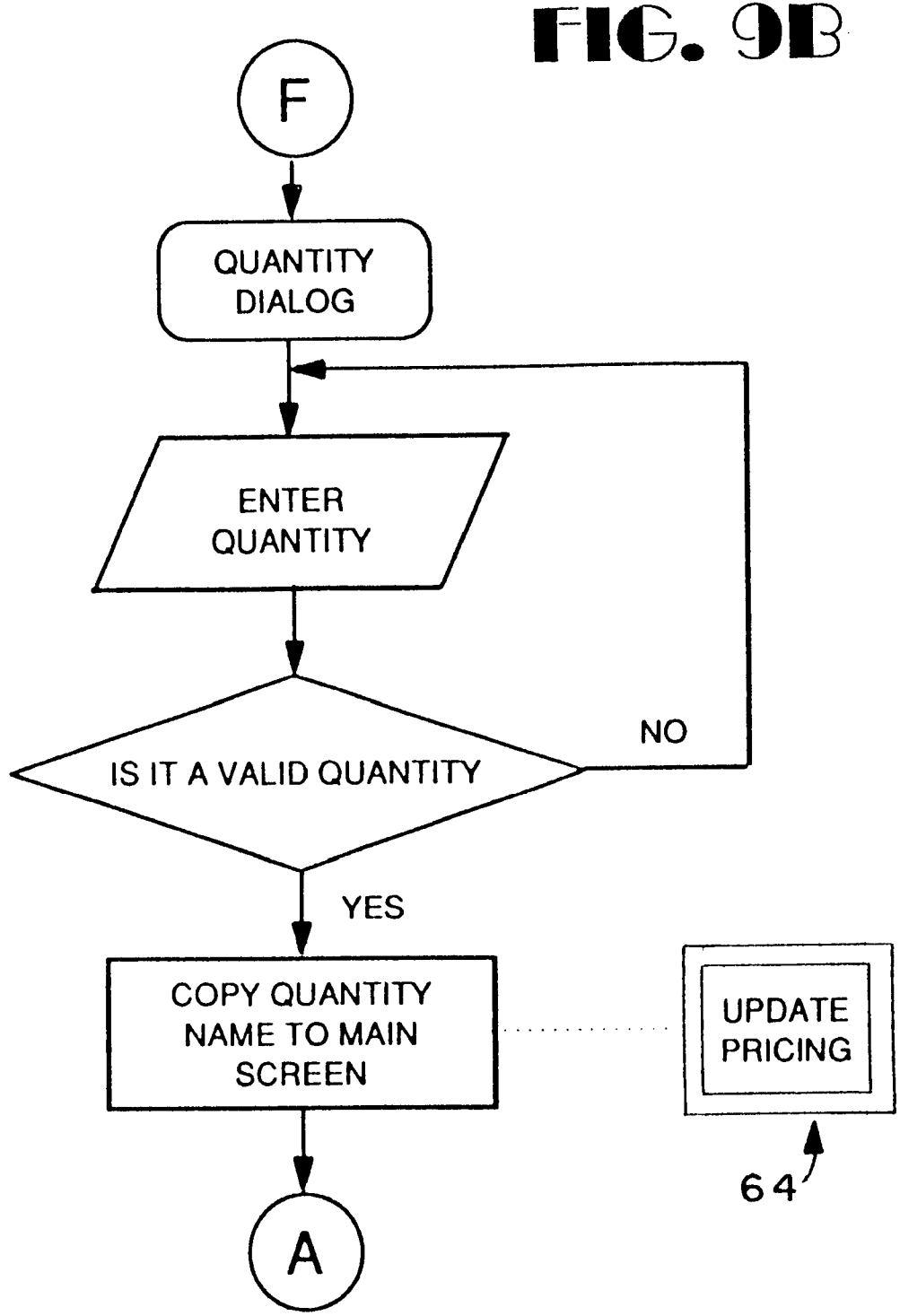

As illustrated in FIG. 9b, in the quantity routine, updated pricing information is sent—see box 64—to a subroutine to be stored and to be ultimately used to calculate a price when enough information has been received to calculate a price. As illustrated in the other parts of FIG. 9, this price is recalculated and updated as more options (e.g. perforations) are added.

Pricing information that needs to be updated may be either provided automatically, or manually by the operator (e.g. see FIG. 8 and column 58 thereof), or at the time of connection just prior to transmittal of the quantity and form information in machine format.

FIG. 9c illustrates the routine followed once the form type function 32 is enabled. Depending upon the form type selected, the paper size and paper type options/functions (33, 34) will be determined. For example if the form type selected is "continuous" there will be one set of paper sizes available, whereas if it is "check" another set of sizes will be available. Similarly, if the form type is multipart the paper type options will be different than if the form type is a single sheet. For example for single sheet the only paper option may be white paper, whereas for multipart the paper type may be all white parts, or white and yellow for a two part form, or white, yellow and pink for a three part form, or white, yellow, pink and goldenrod for a four part form. Once the appropriate paper size and paper type dialogs have been assigned as indicated by box 65, then the appropriate additional function buttons are activated as indicated at 66.

Figure 9D:
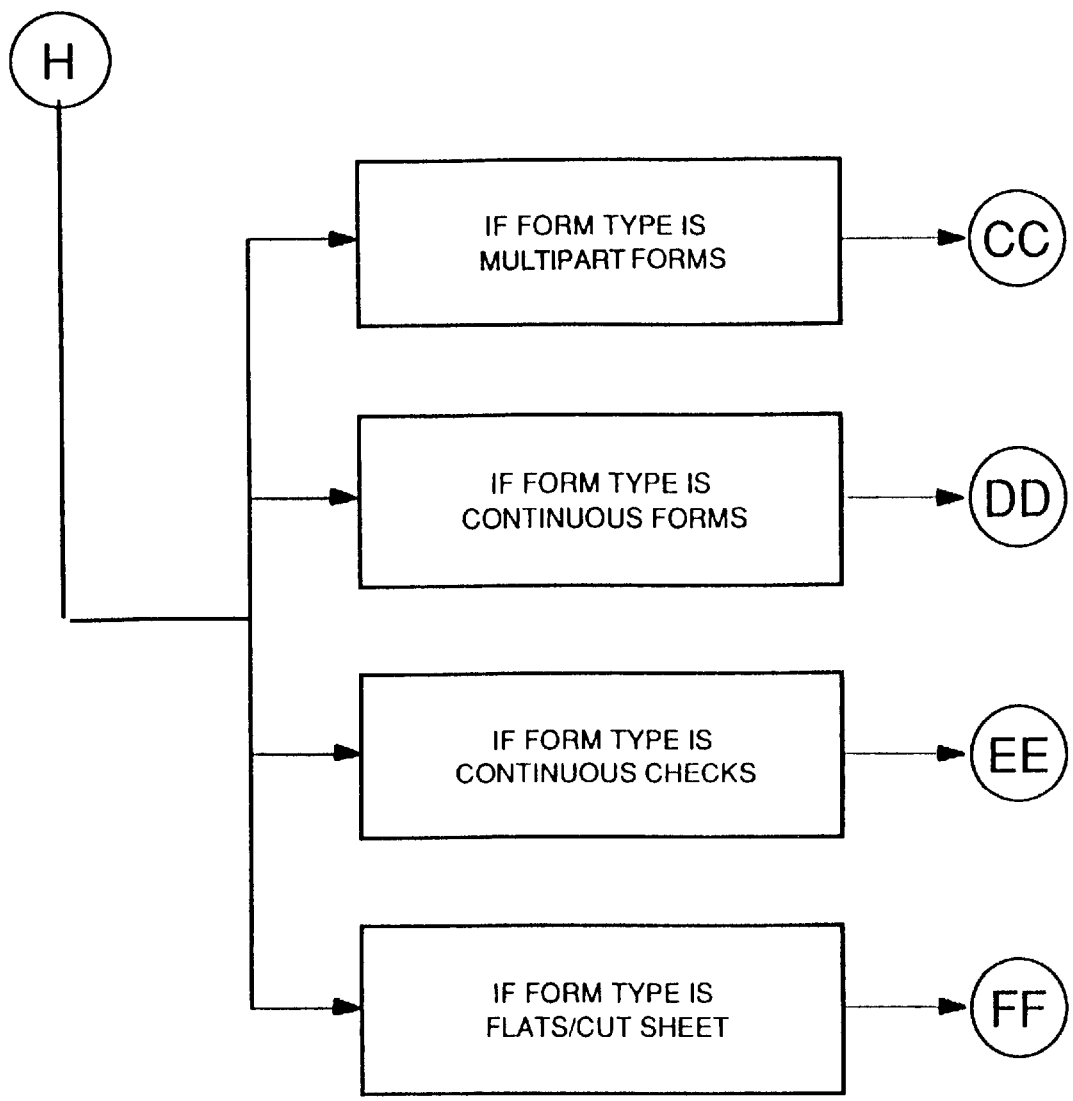
Figure 9E:
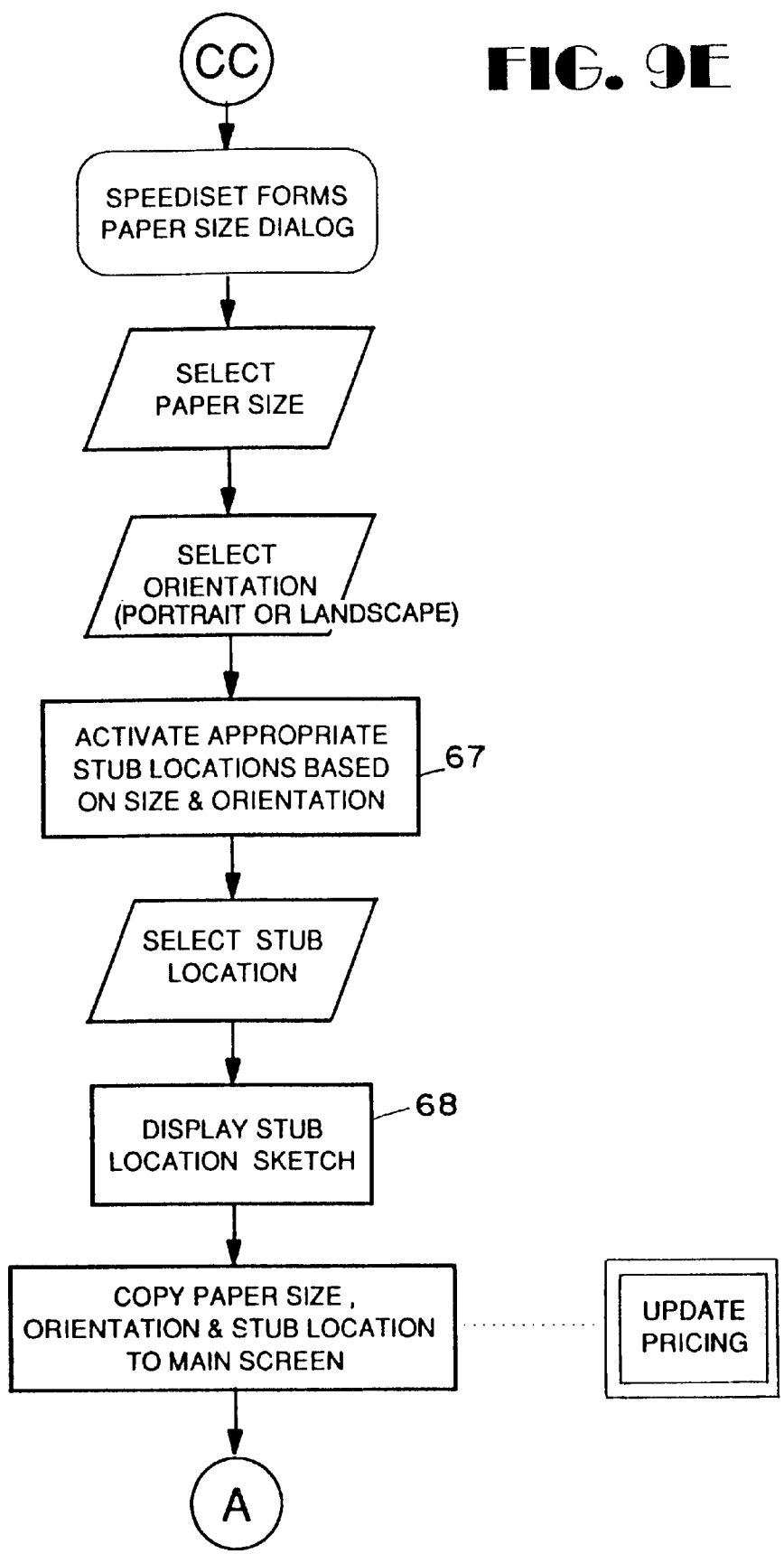
Figure 9G:
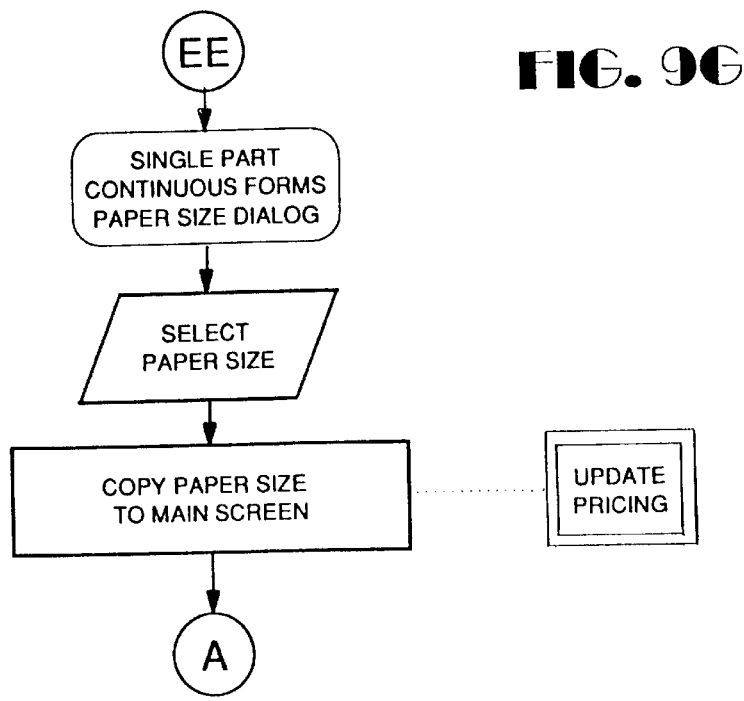
Figure 9H:
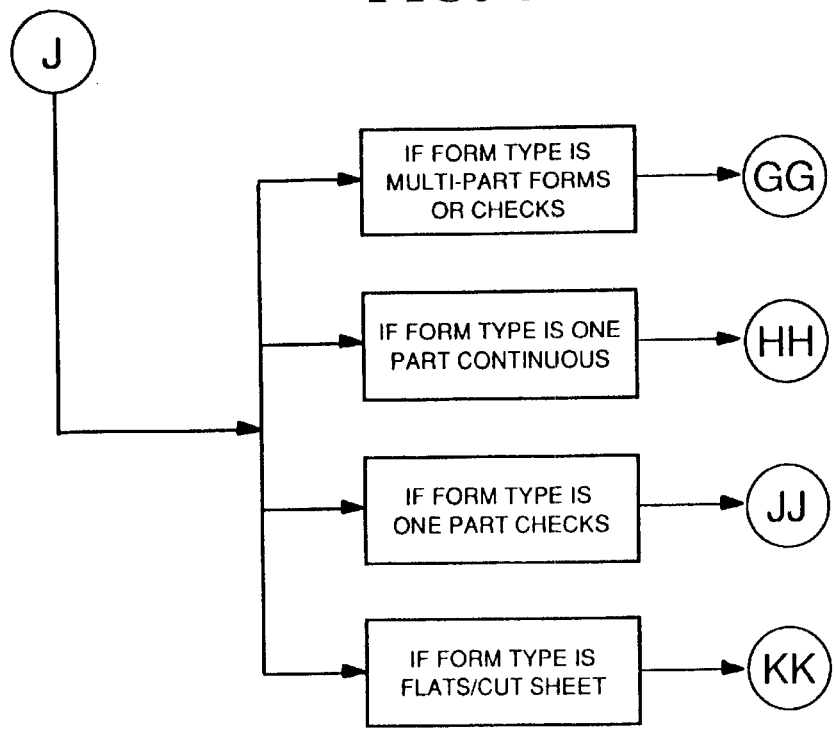
Figure 9I:
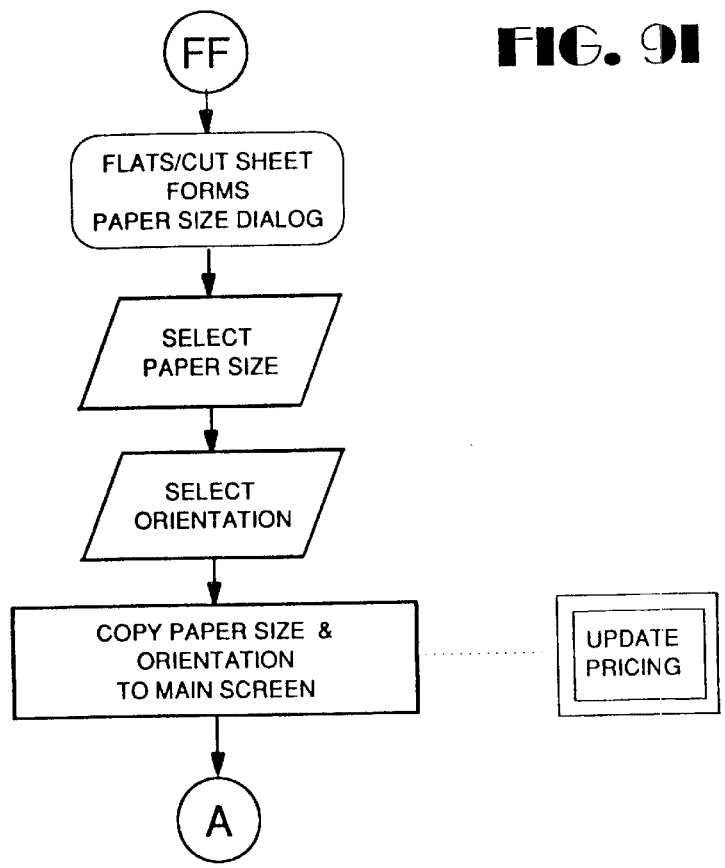
Figure 9J:
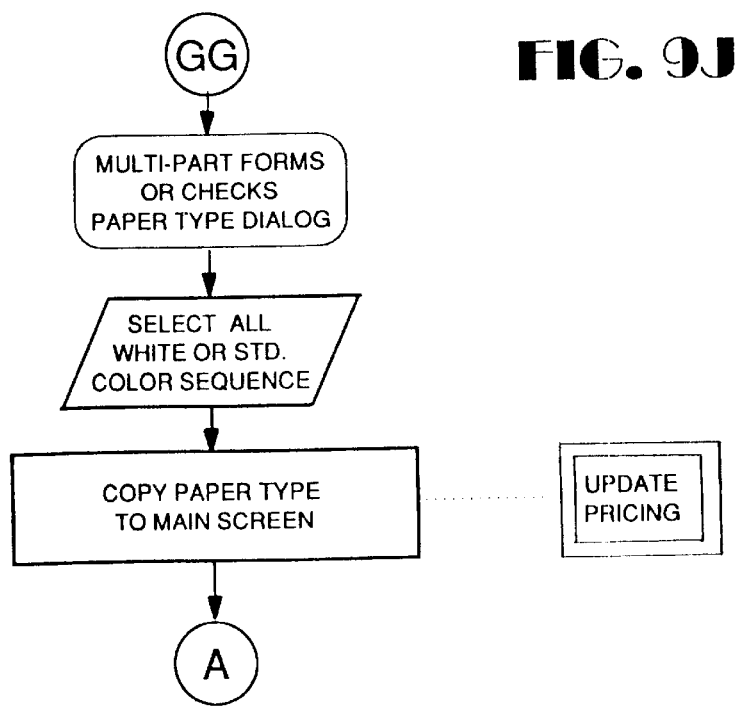
Figure 9K:
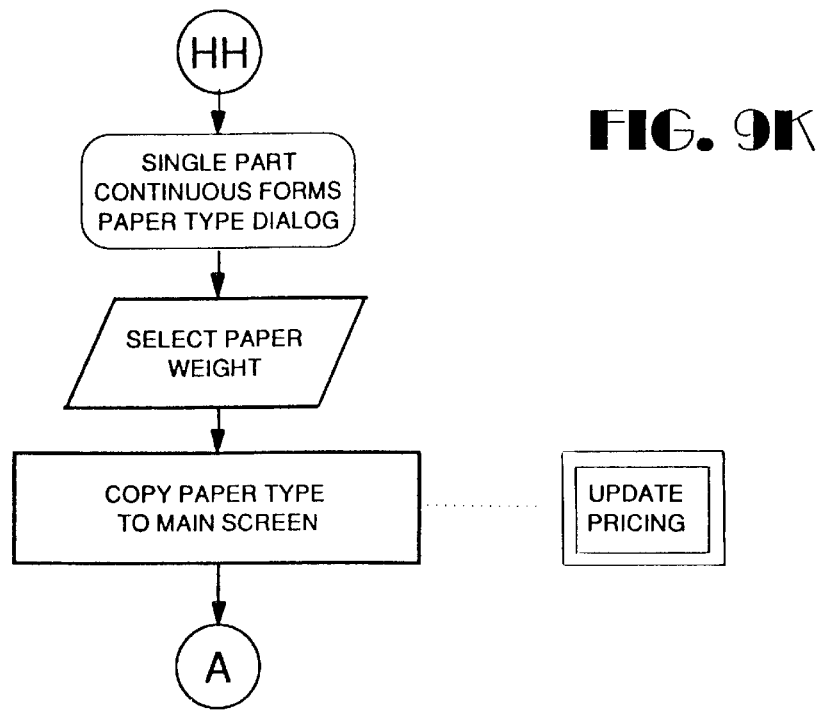
Figure 9M:
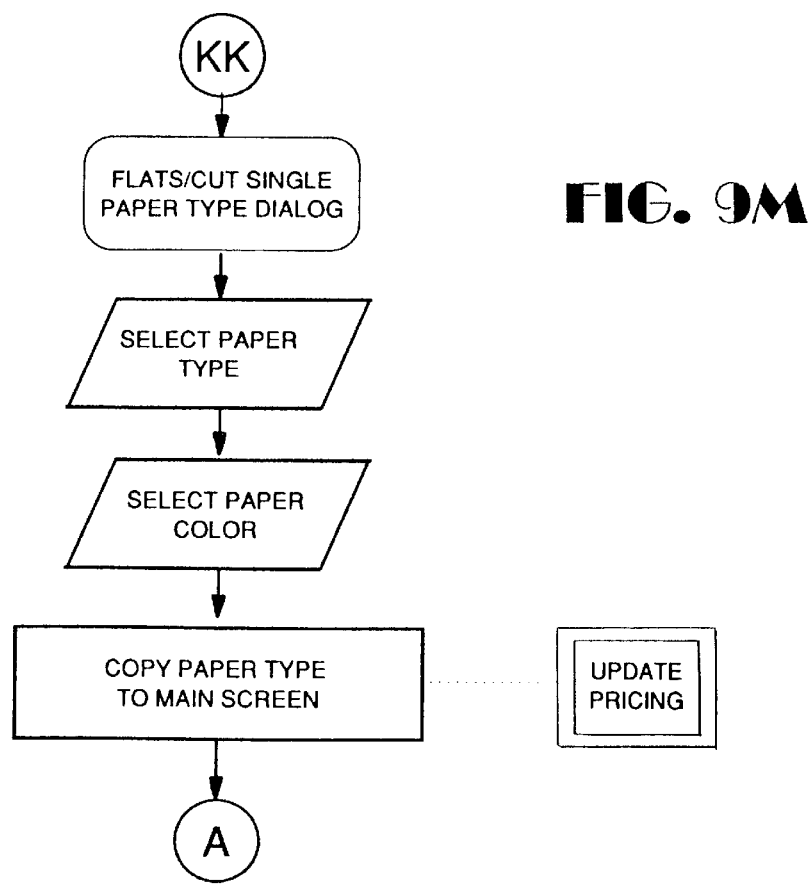
Figure 9N:
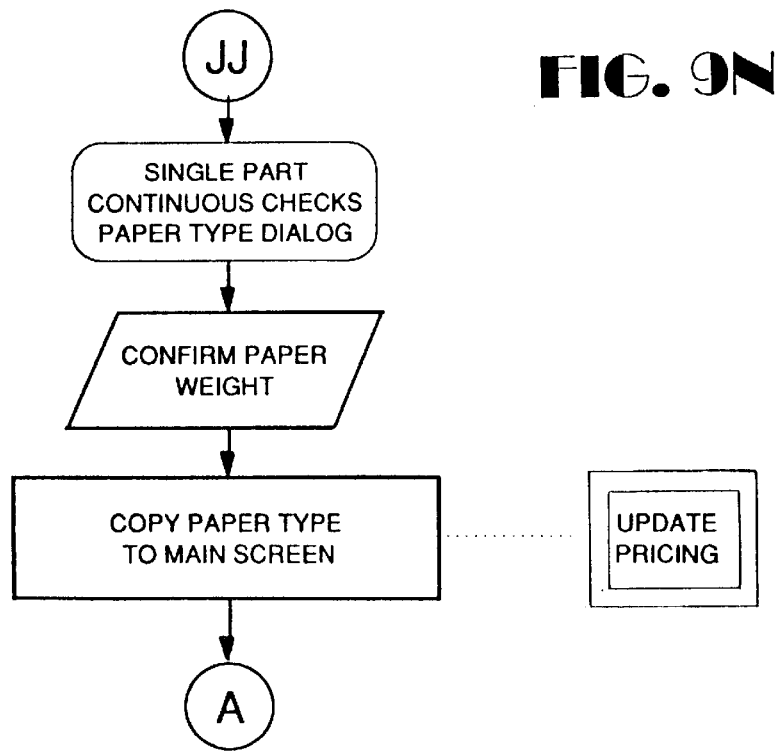
Figure 9P:
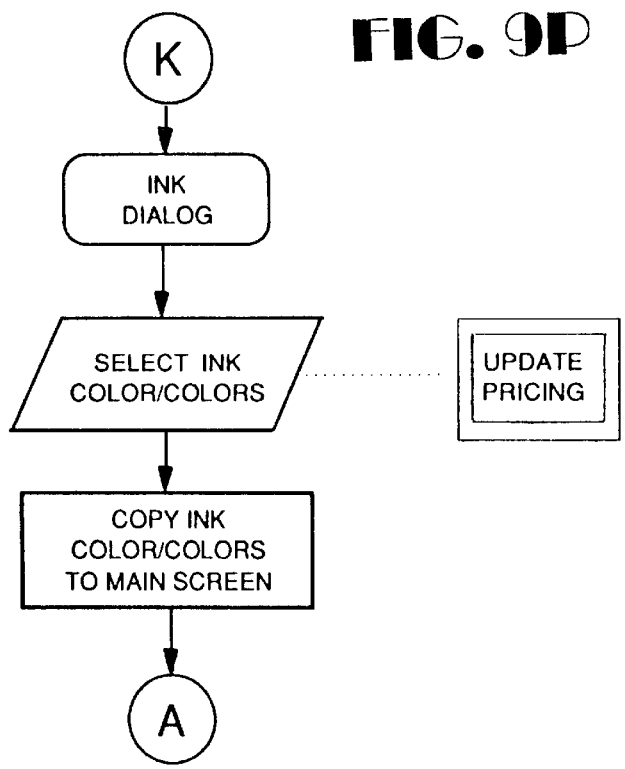
Figure 9Q:
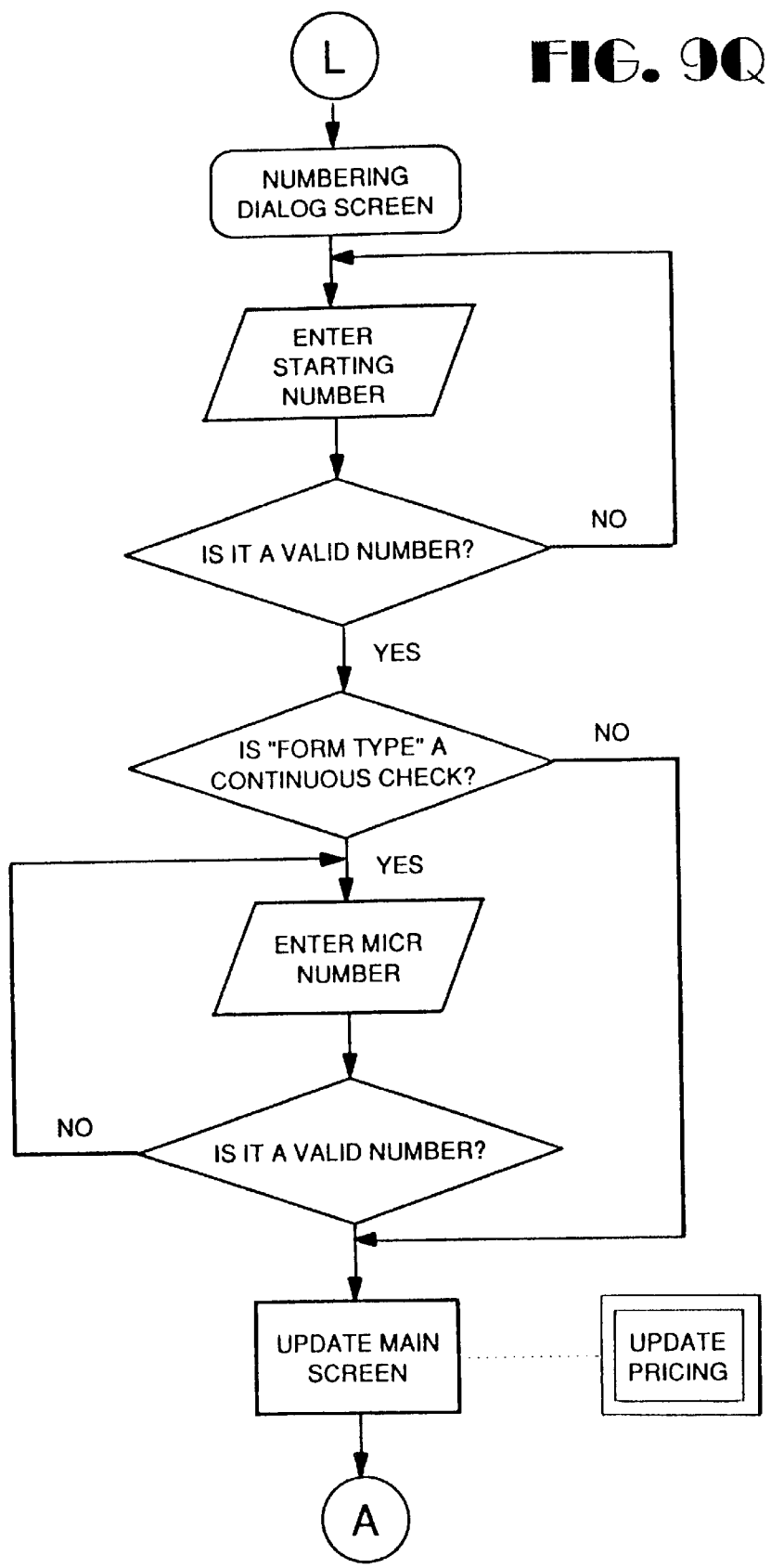
Figure 9R:
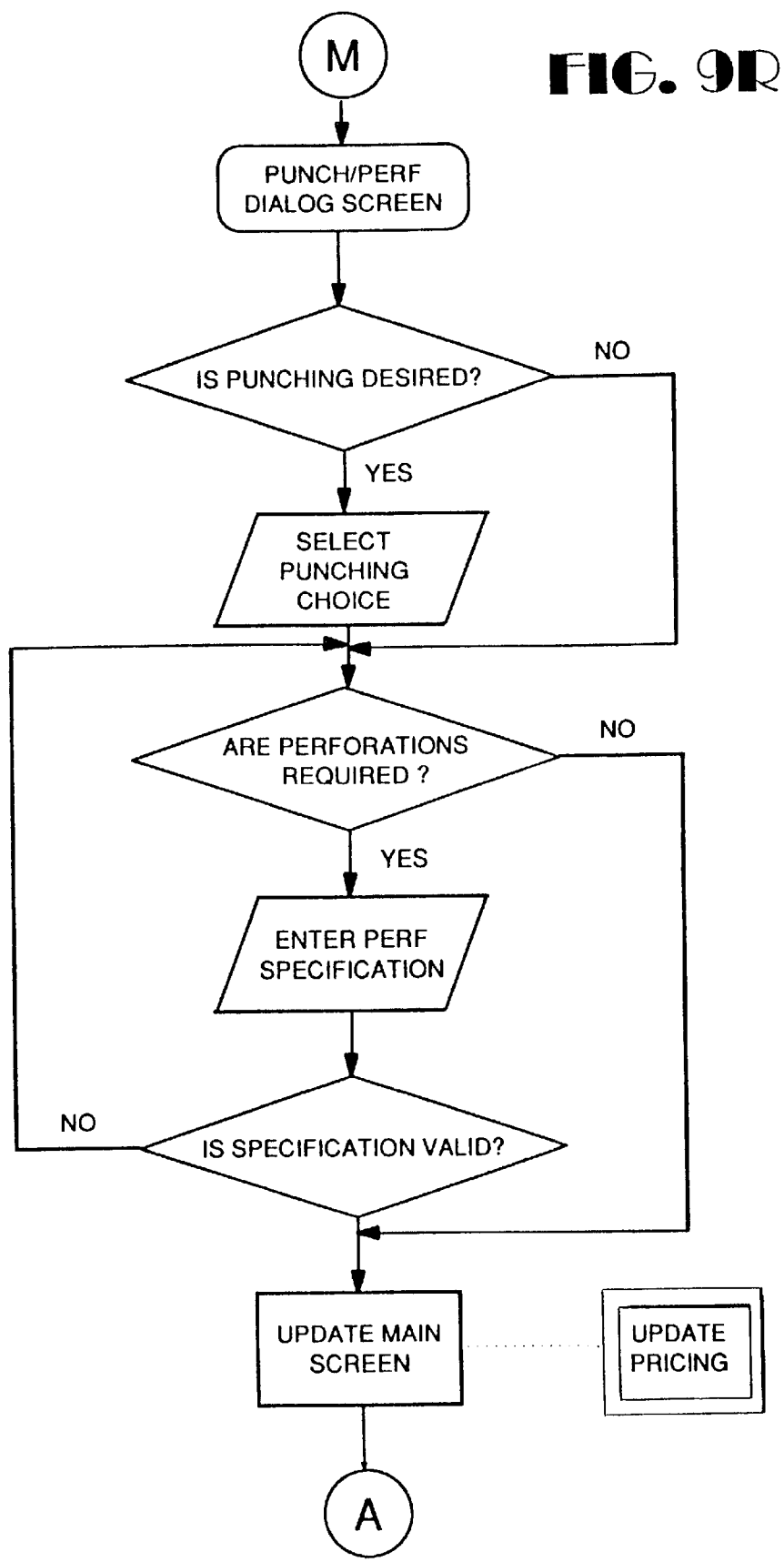
Figure 9S:
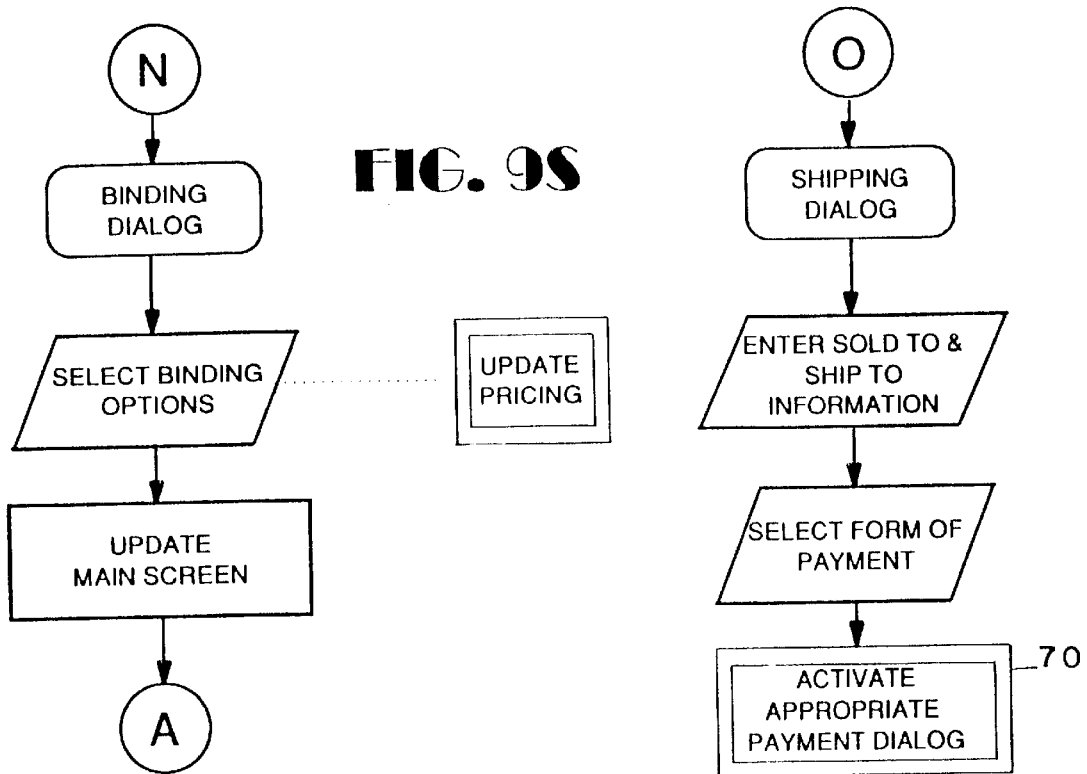

As illustrated in FIG. 9e by boxes 67 and 68—and as already described above with respect to FIG. 5—once the paper size and orientation have been selected, the appropriate stub locations are activated, and once the stub location is activated, the pictorial illustration or sketch 55 is displayed.

As illustrated with respect to FIG. 9f, if a continuous forms option is selected in FIG. 9d, then the paper width is selected and then—as indicated by box 69—the paper length choices are determined based upon the width selected; then length is selected.

Figure 9T:
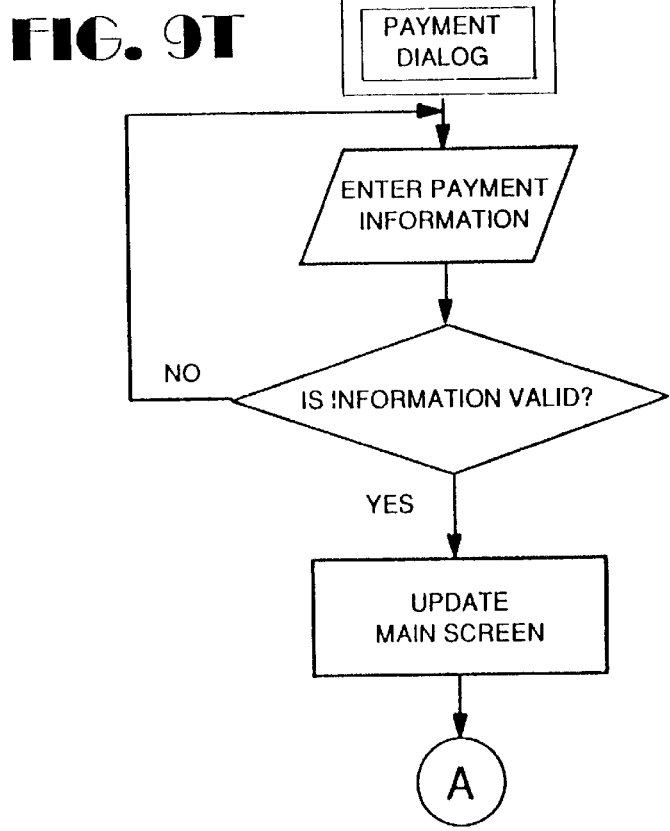
Figure 9U:
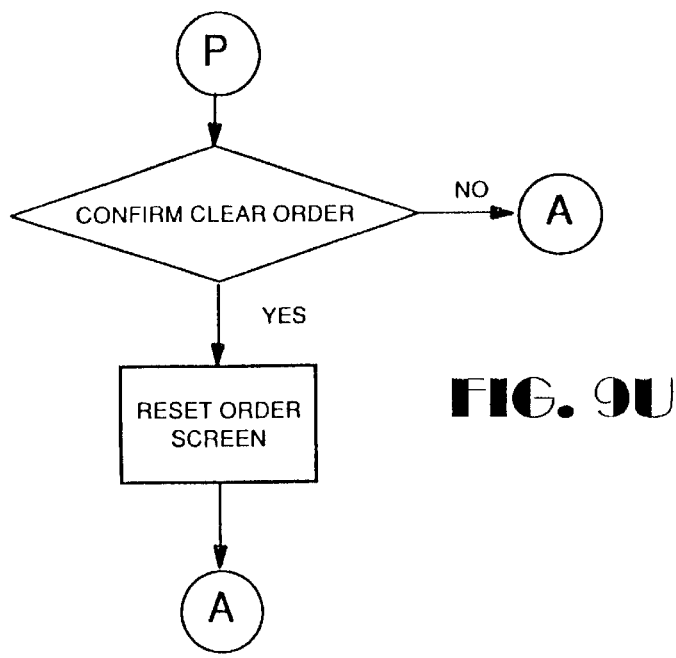
Figure 9V:
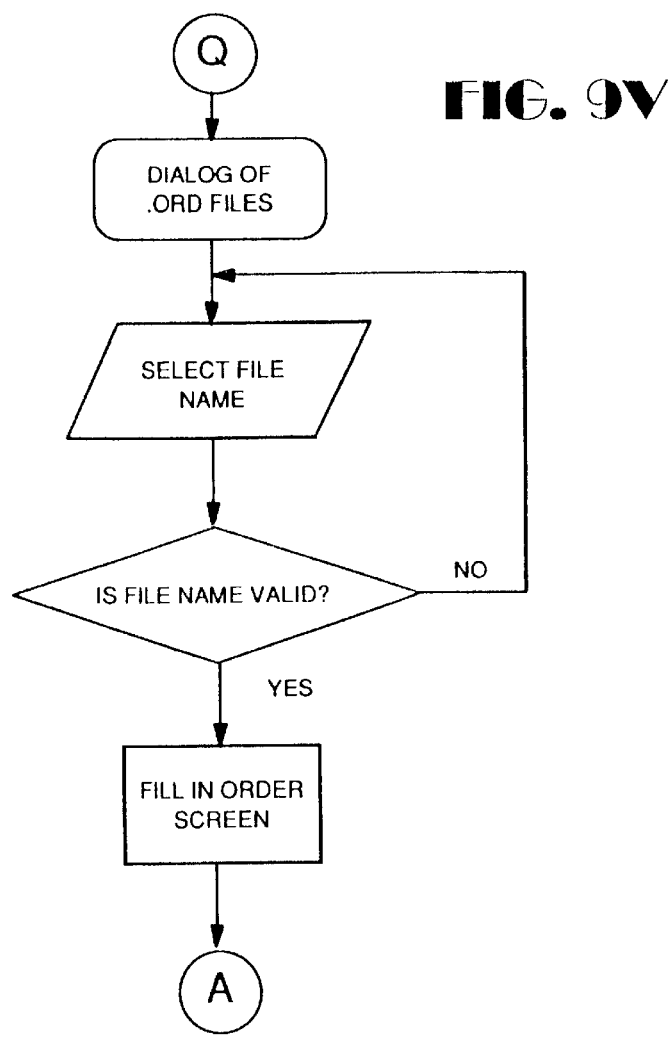
Figure 9W:
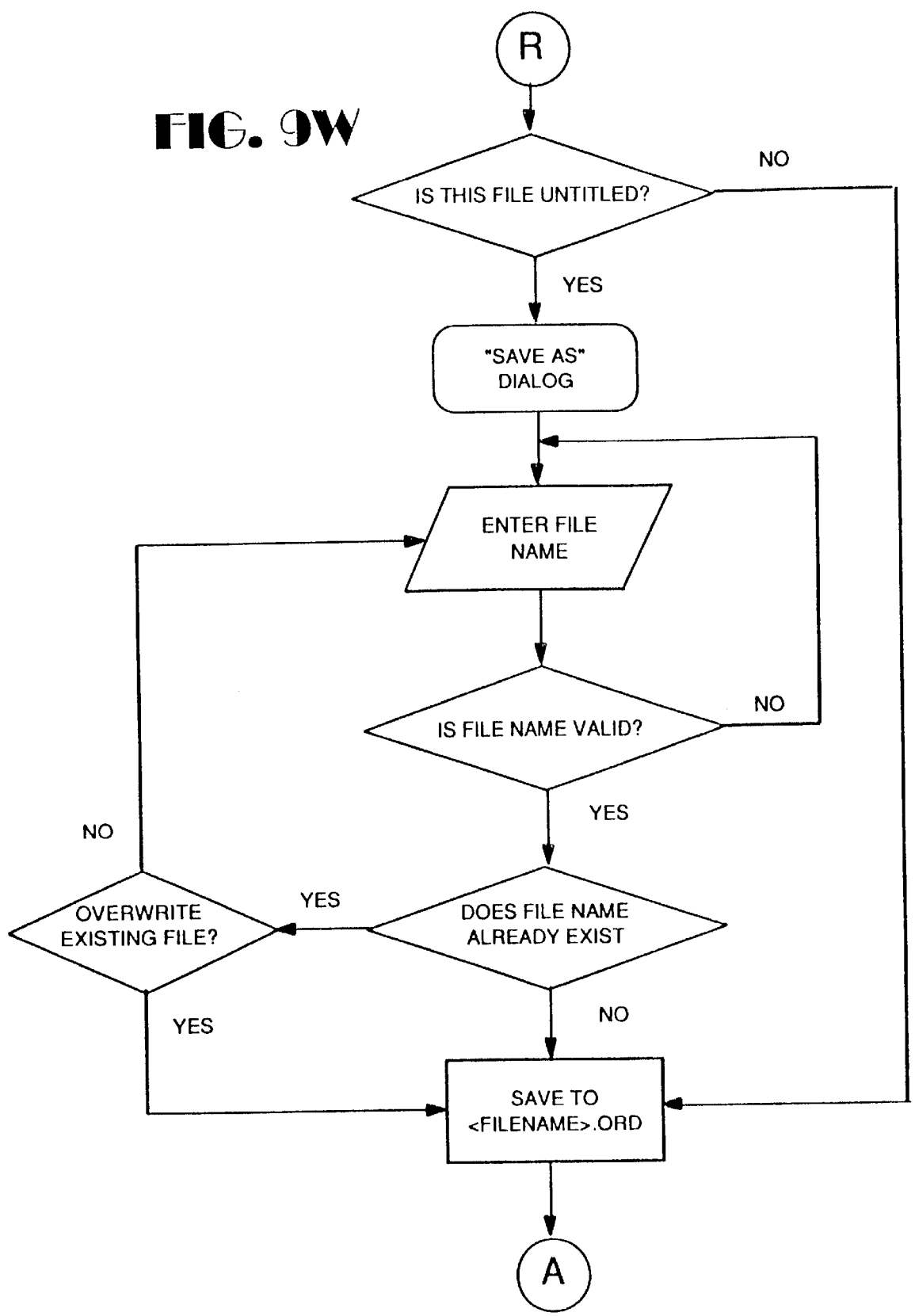
Figure 9Y:
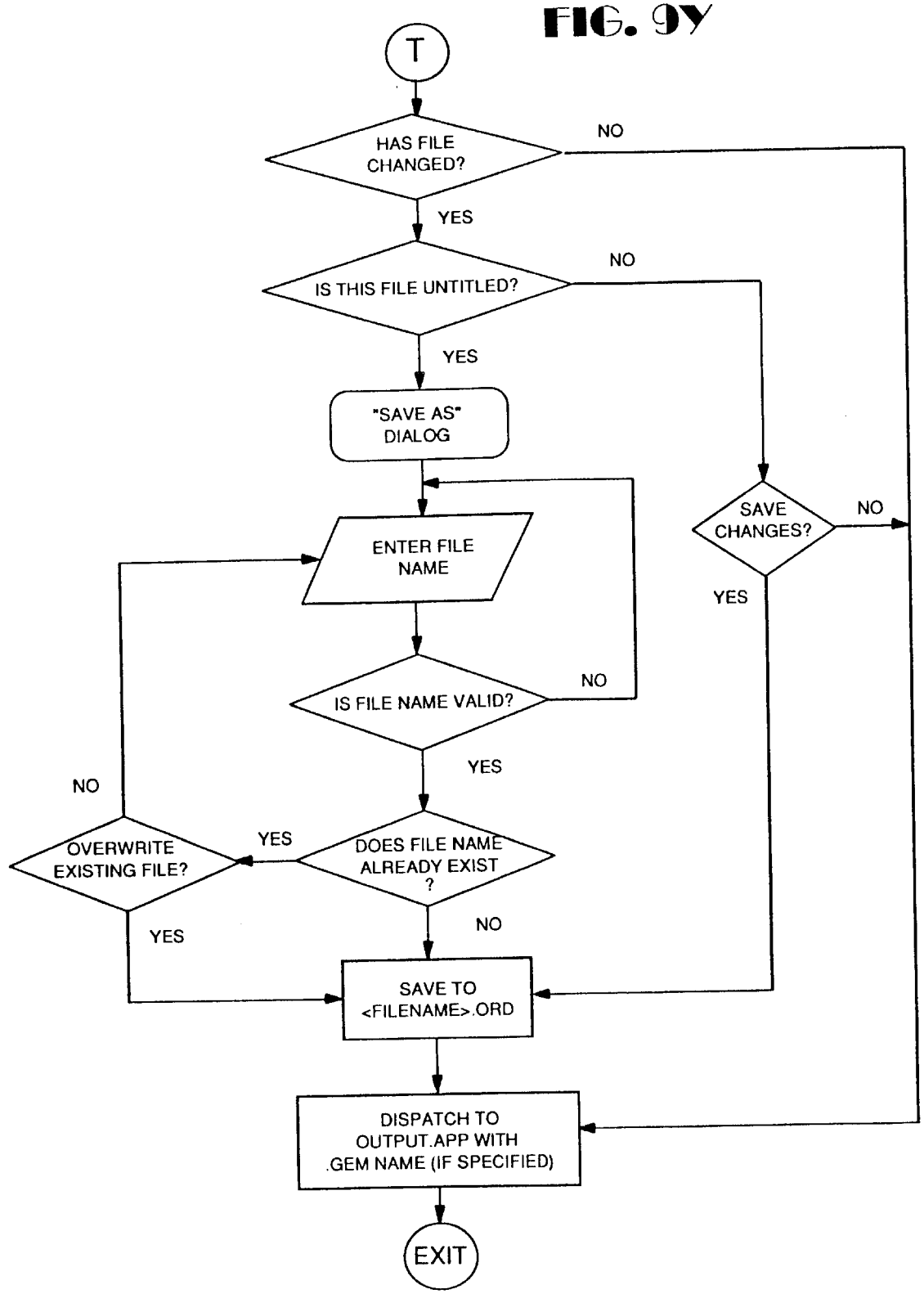
Figure 9Z:
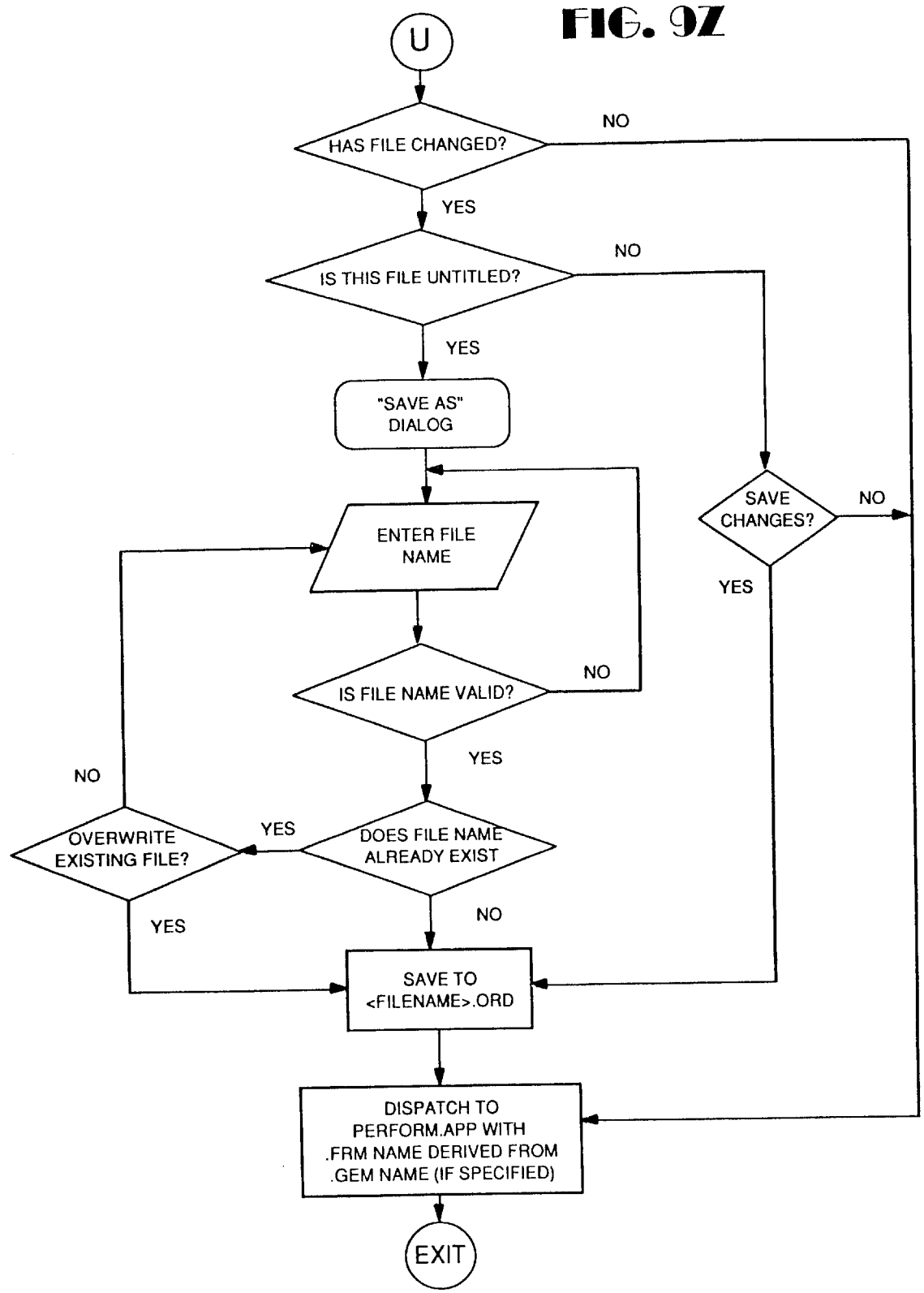
Figure 9A:
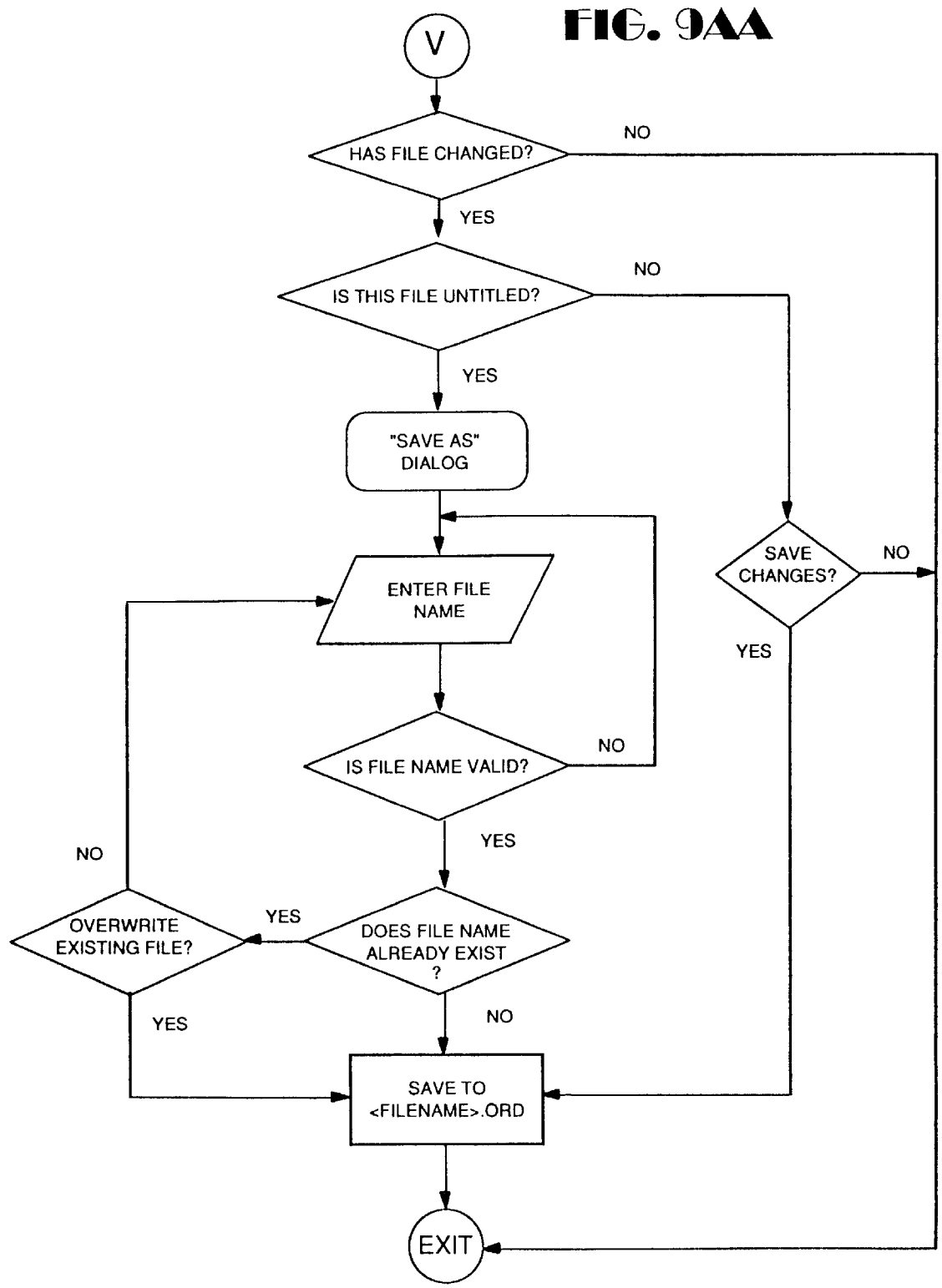
Figure 9A:
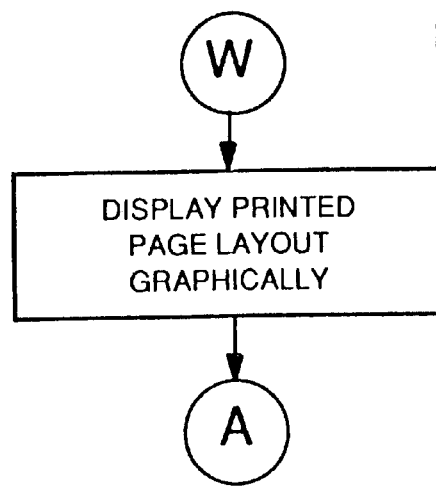
Figure 9A:
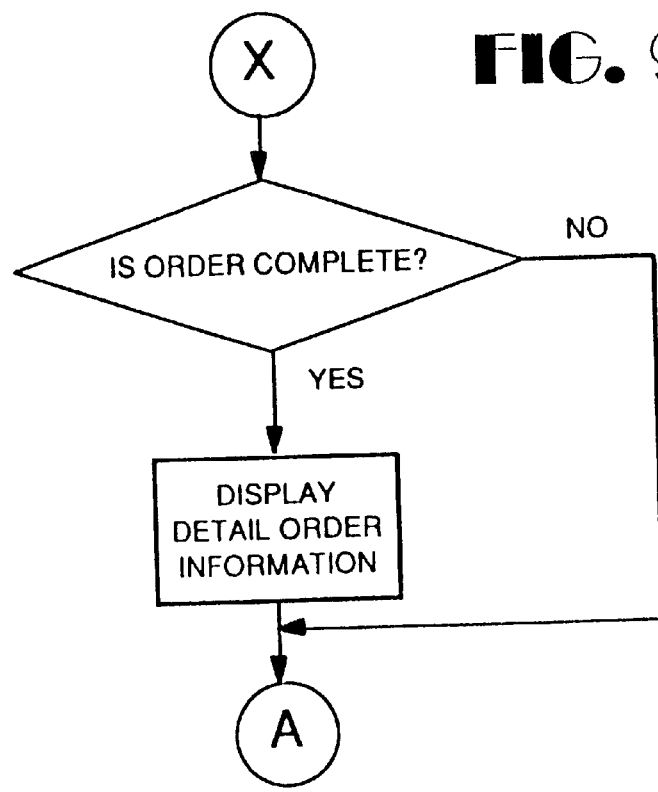
Figure 9A:
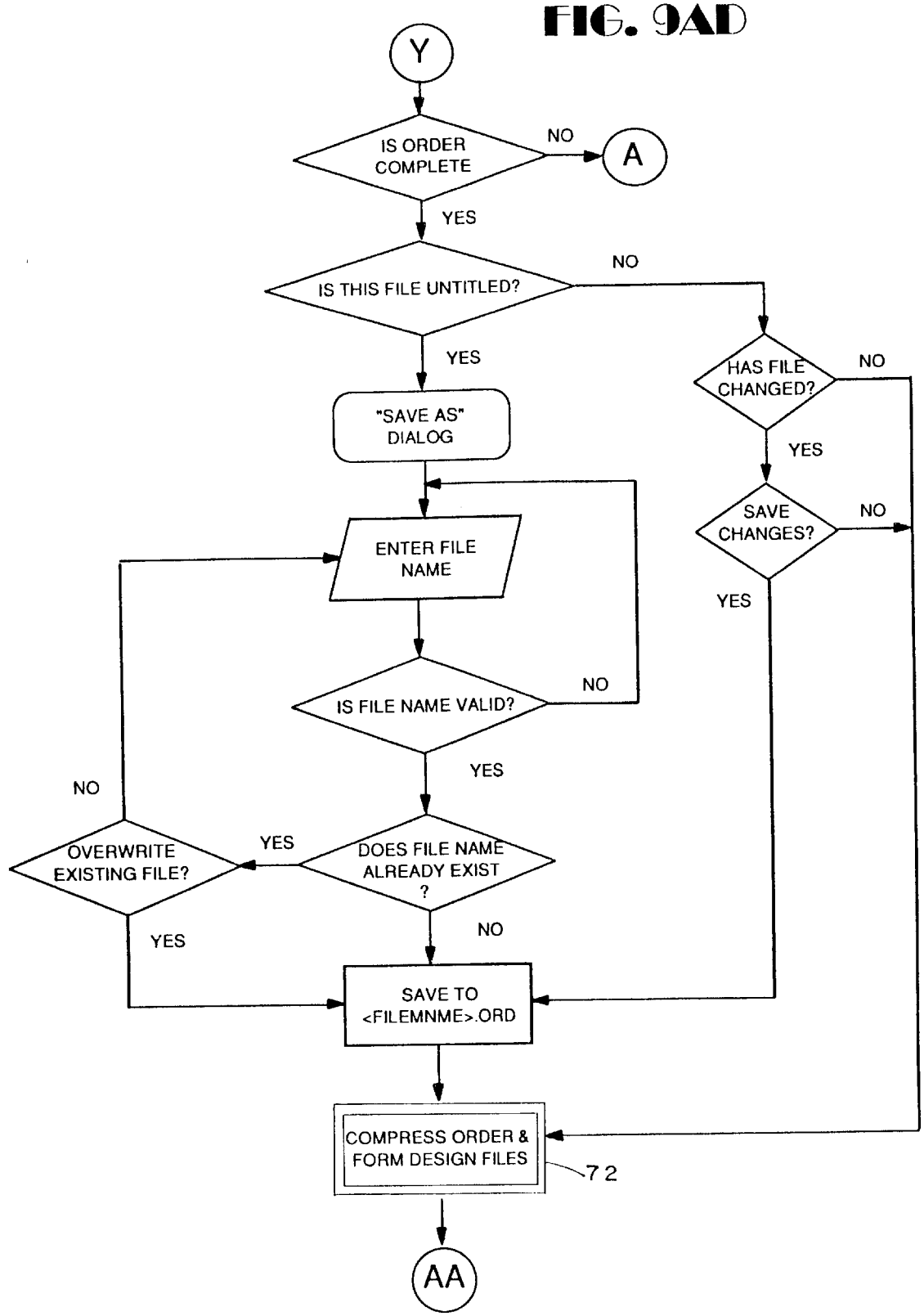
Figure 9A:
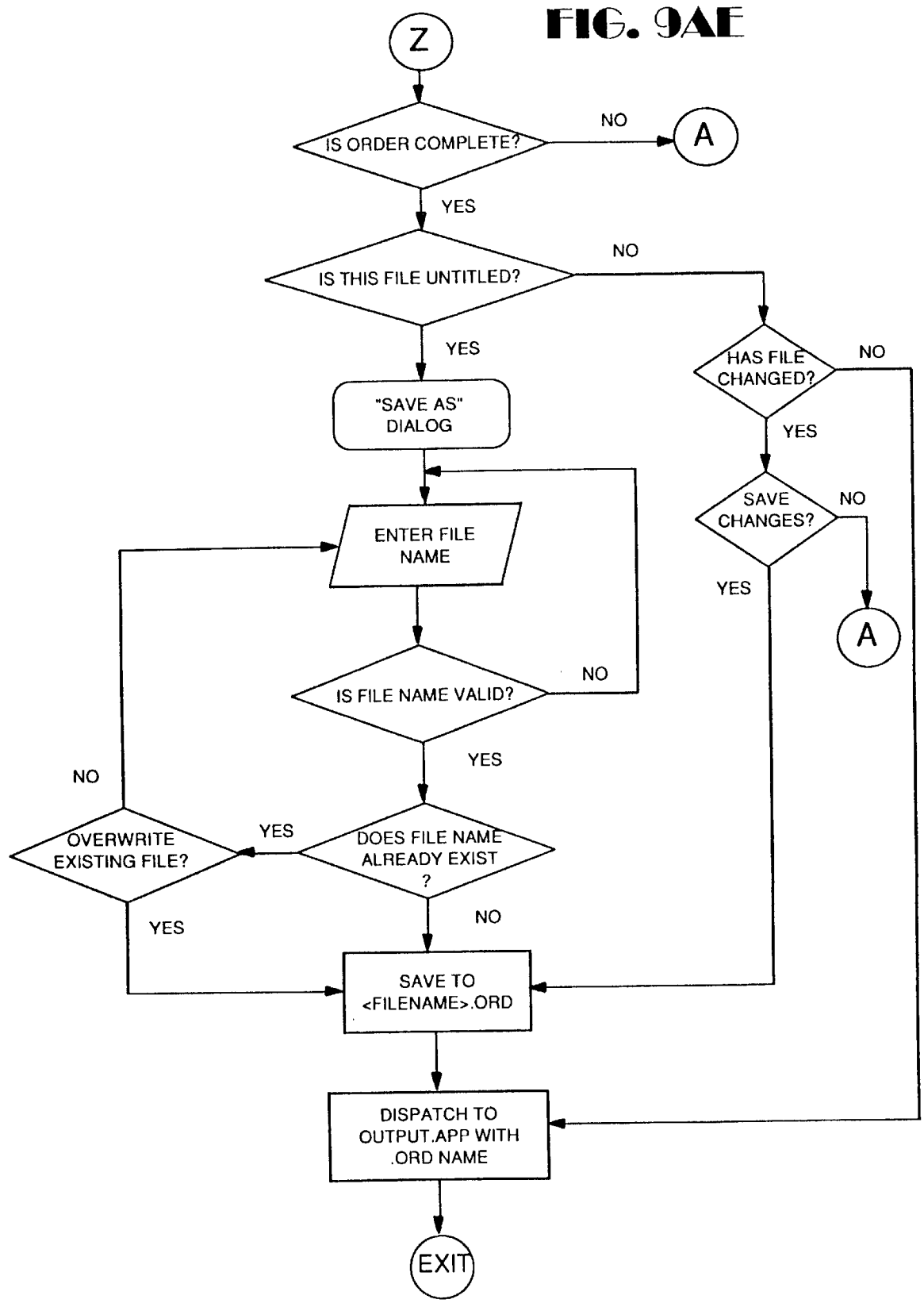
Figure 9A:
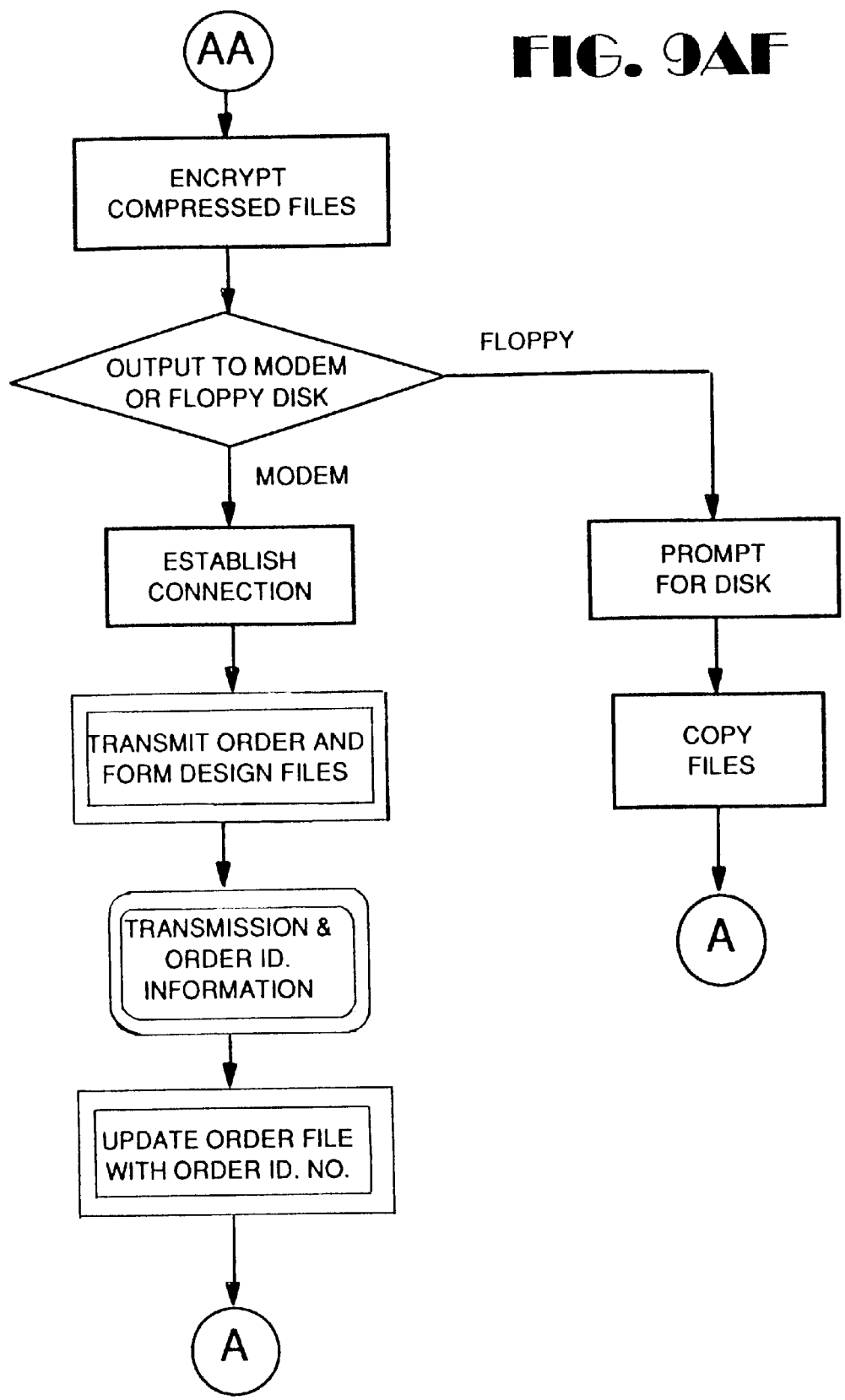

As illustrated in FIG. 9t, when the shipping information, function 39 in FIG. 3, is entered, it is desirable to also display for the operator's selection the form of payment. Typical forms of payment would be C.O.D., account number with the forms manufacturer, or credit card. If the credit card option were initiated, then—as illustrated schematically by box 70—in order to make the unit most user friendly the types of credit cards that are selectable would be pictorially displayed on screen 40 of monitor 15. If a color monitor 15 is available, the credit cards illustrated can be, e.g., an accurate representation of a typical VISA® or American Express® card, which minimizes the possibility that the user could make a mistake in entering information about one type of credit card thinking it was another. Once the credit card number is entered, then—if it is determined to be valid—the sub-routine of FIG. 9t is completed.

FIG. 9ad illustrates the routine when it is desired to transmit the completed information (see FIG. 7). Ultimately, the last step of the routine—as indicated by block 72—is to compress the order and the form design files, so that they can then be transmitted. In the system according to the invention—as distinct from the prior art—both the custom form design in machine format, and the order information in machine format, are simultaneously transmitted (preferably through modems 17, 18) to the first computer 10. The transmission—which occurs immediately after compression at box 72—is illustrated schematically in FIG. 9af.

Figure 10A:
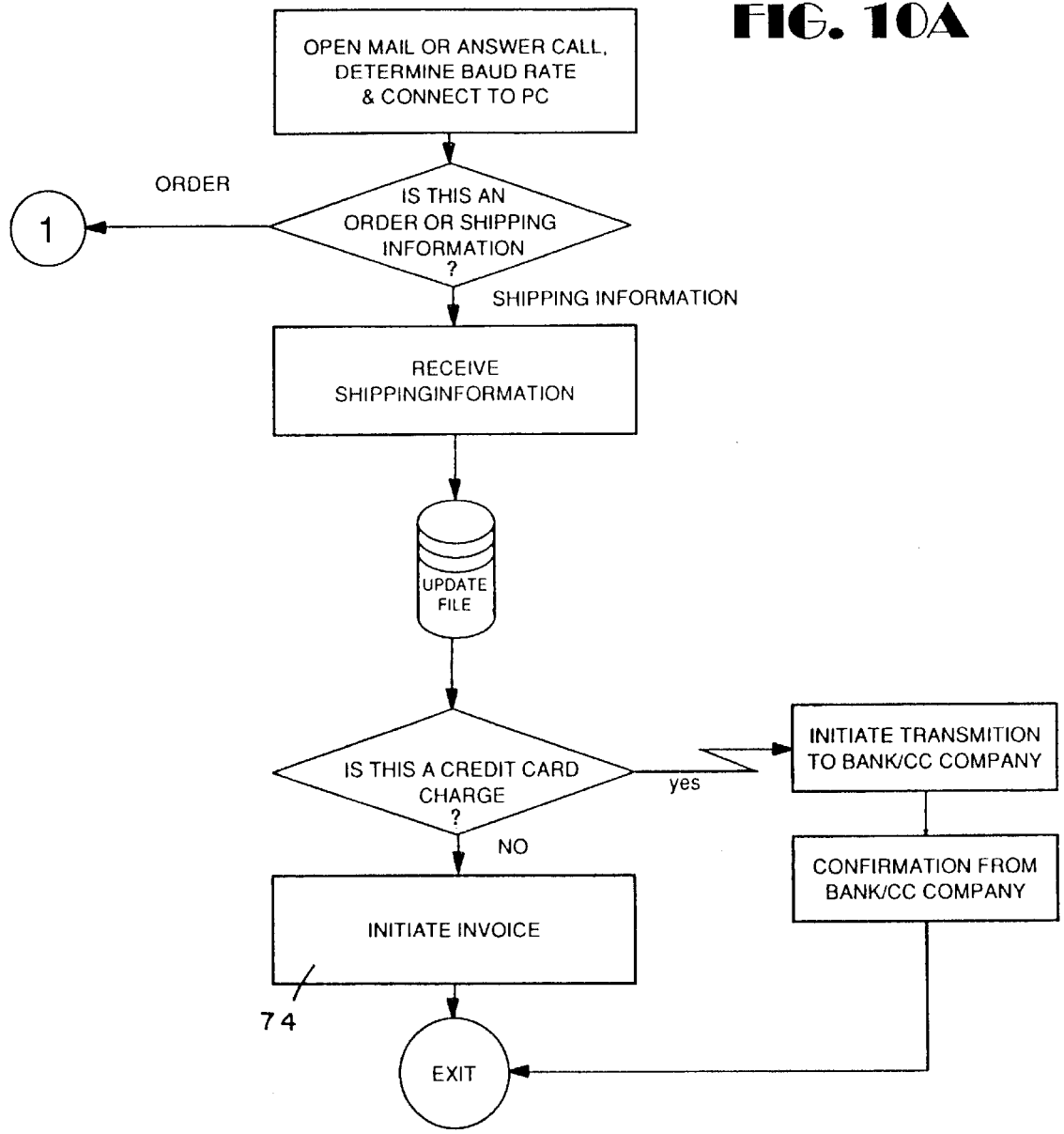

The order receiving flow charts are illustrated in FIGS. 10a and 10b. These procedures are internal to the computer 10. Note that an invoice is automatically initiated at 74 if it is not a credit card charge. The order itself is handled in the routine illustrated in FIG. 10b. Please note— as indicated by box 75—that the order identification number (order confirmation) is generated and transmitted—either electronically or by mail—to the customer. The procedure in box 76 is typically effected at proof printer 22 (although proofing is optional), and at box 77 the order is evaluated in order to determine the optimum location for printing of the form, given the form type and shipping information, and the scheduling of the various production sites 27.

Figure 11:
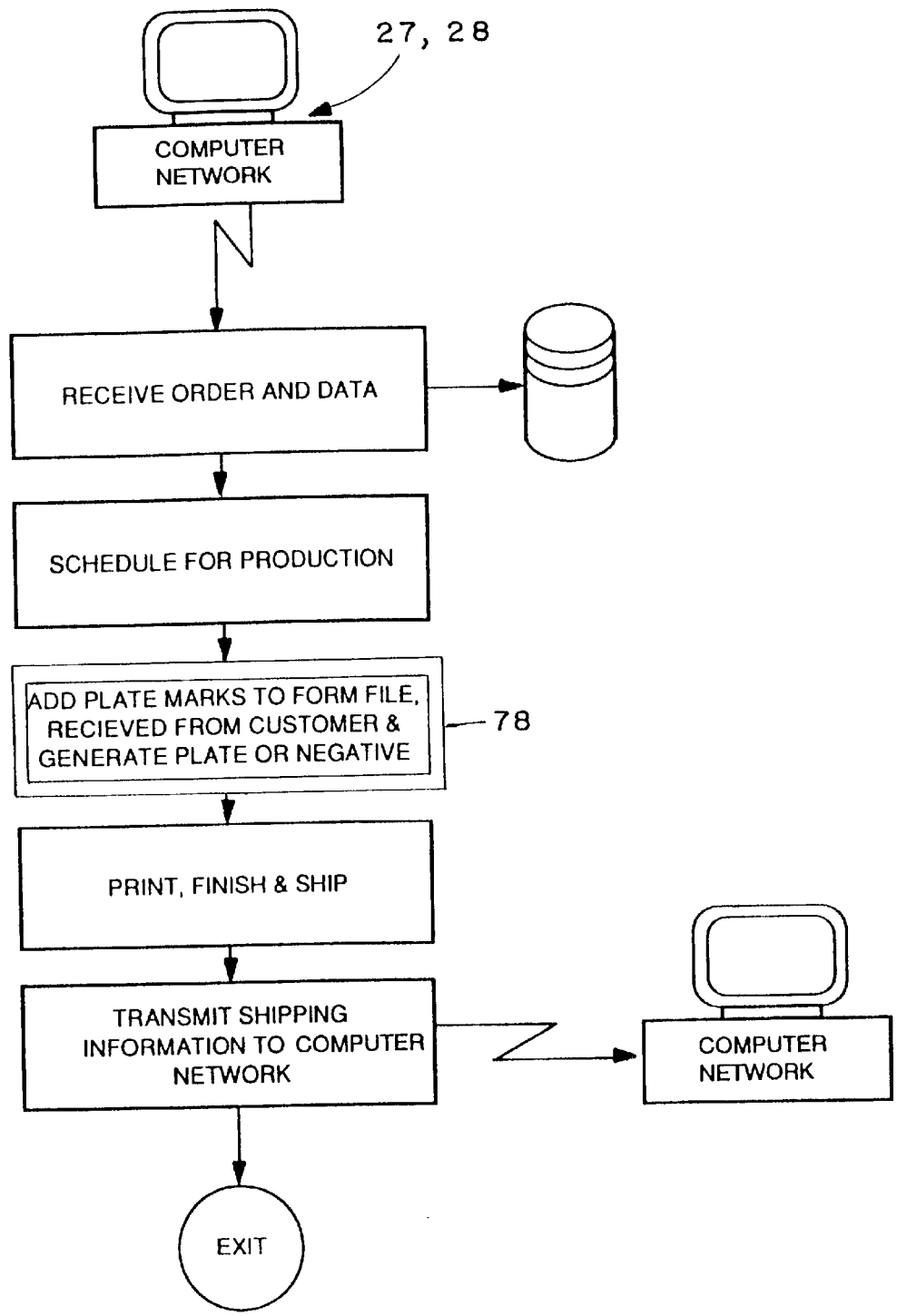
FIG. 11 is a flow sheet showing the production site procedures after an order has been transmitted thereto.

FIG. 11 schematically illustrates the procedures at the production site 27, 28, the order having been received electronically in machine format and then scheduled for production. As illustrated by box 78, plate marks are added to the form file, and the form received from the customer— with plate marks—in machine format is used to generate a plate or negative for ultimate printing.

It will be seen that according to the invention, one can efficiently effect design, printing, and delivery of short runs of custom business forms, and for making any computer order system or the like more user friendly. According to the invention, the following general steps are taken: (a) at a first location, designing a custom business form in machine format, providing order information including quantity and shipping information in machine format, and automatically determining the cost of production using price information in machine format; (b) transmitting the custom business form in machine format and the order information in machine format to a second location, remote from the first location; (c) at the second location, automatically determining where and how best to produce the custom business form given the scheduling of printing facilities, the type of form, and the shipping information, and assigning the order to the optimum printing facility for production of that form; and (d) printing the custom business form order at the optimum printing facility, and shipping it in accordance with the shipping information from step (a).

The further step may be practiced, during the practice of step (a), of pictorially illustrating a custom business form on a computer monitor so that the form designer can better visualize the custom form being ordered. The still further step may be practiced, during the practice of step (a), of displaying or highlighting only subsequent options that are available for selection depending upon earlier selections made.

It will thus be seen that according to the present invention an effective and advantageous system has been provided for the production of short runs of custom business forms, and for making any computer order system or the like more user friendly. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent systems, procedures, and configurations.

What is claimed is:

1. Computer selection and display means comprising:

a computer having a monitor; and means for controlling said computer and said monitor: to provide a first set of a plurality of selectable options on said monitor; to provide a graphic display of second and third sets of selectable options overlying, but not completely obscuring, the first set of options; and for providing a fourth set of selectable options graphically displayed with said second and third sets of options, and highlighting only selected ones of said fourth set of options depending upon the selections of said second and third sets of options.

2. Computer selection and display means as recited in claim 1 wherein said means for controlling said computer and said monitor further comprises means responsive to preliminary selection of said fourth set of options for pictorially illustrating a simulation of an object to be created by control of said computer, so that an operator may more easily visualize the object to be created.

3. Computer selection and display means as recited in claim 2 wherein said selection and display means comprise selections for the creation of a business form, and wherein said first set of options comprises a business form type option including multipart forms, and a form size option, and wherein said second and third sets of options for said form size option, once a multipart form has been selected by said form type option, comprise predetermined length and corresponding width options and either portrait or landscape orientation options; and wherein said fourth set of options comprise top, bottom, right, or left edge attachment locations.

4. Computer selection and display means as recited in claim 3 wherein said means for pictorially illustrating a simulation of an object illustrates a rectangular object having a highlighted edge, the highlighted edge corresponding to the fourth set of options preliminarily selected.

5. Computer selection and display means as recited in claim 3 further comprising means for displaying credit card options as a method of payment, including means for pictorially illustrating a particular vendor's credit card on said monitor.

6. Computer selection and display means as recited in claim 5 wherein said first set of selectable options comprise rectangular boxes, and wherein the box to be selected is highlighted; and wherein said second and third sets of selectable options similarly comprise rectangular boxes with indicia therein, at least a portion of the box to be selected being highlighted.

7. Computer selection and display means as recited in claim 3 wherein said first set of selectable options comprise rectangular boxes, and wherein the box to be selected is highlighted; and wherein said second and third sets of selectable options similarly comprise rectangular boxes with indicia therein, at least a portion of the box to be selected being highlighted.

8. Computer selection and display means as recited in claim 2 wherein said first set of selectable options comprise rectangular boxes, and wherein the box to be selected is highlighted; and wherein said second and third sets of selectable options similarly comprise rectangular boxes with indicia therein, at least a portion of the box to be selected being highlighted.

9. Computer selection and display means as recited in claim 8 further comprising means for displaying credit card options as a method of payment, including means for pictorially illustrating a particular vendor's credit card on said monitor.

10. Computer selection and display means as recited in claim 2 further comprising means for displaying credit card options as a method of payment, including means for pictorially illustrating a particular vendor's credit card on said monitor.

11. Computer selection and display means as recited in claim 1 wherein said selection and display means comprise selections for the creation of a business form, and wherein said first set of options comprises a business form type option including multipart forms, and a form size option, and wherein said second and third sets of options for said form size option, once a multipart form has been selected by said form type option, comprise predetermined length and corresponding width options, and portrait or landscape orientation options; and wherein said fourth set of options comprise top, bottom, right, or left edge attachment locations.

12. Computer selection and display means as recited in claim 11 wherein said first set of selectable options comprise rectangular boxes, and wherein the box to be selected is highlighted; and wherein said second and third sets of selectable options similarly comprise rectangular boxes with indicia therein, at least a portion of the box to be selected being highlighted.

13. Computer selection and display means as recited in claim 12 further comprising means for displaying credit card options as a method of payment, including means for pictorially illustrating a particular vendor's credit card on said monitor.

14. Computer selection and display means as recited in claim 11 further comprising means for displaying credit card options as a method of payment, including means for pictorially illustrating a particular vendor's credit card on said monitor.

15. Computer selection and display means as recited in claim 1 wherein said first set of selectable options comprise rectangular boxes, and wherein the box to be selected is highlighted; and wherein said second and third sets of selectable options similarly comprise rectangular boxes with indicia therein, at least a portion of the box to be selected being highlighted.

16. Computer selection and display means as recited in claim 1 further comprising means for displaying credit card options as a method of payment, including means for pictorially illustrating a particular vendor's credit card on said monitor.

* * * * *